(12) United States Patent
Hageraats et al.

(10) Patent No.: US 10,230,417 B2
(45) Date of Patent: Mar. 12, 2019

(54) MULTI-INPUT AMPLIFIER WITH DEGENERATION SWITCHING BLOCK AND LOW LOSS BYPASS FUNCTION

(71) Applicant: SKYWORKS SOLUTIONS, INC., Woburn, MA (US)

(72) Inventors: Johannes Jacobus Emile Maria Hageraats, Kamuela, HI (US); Junhyung Lee, Irvine, CA (US); Joshua Haeseok Cho, Irvine, CA (US); Aravind Kumar Padyana, Costa Mesa, CA (US); Bipul Agarwal, Irvine, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 15/690,947

(22) Filed: Aug. 30, 2017

(65) Prior Publication Data

US 2018/0062690 A1 Mar. 1, 2018

Related U.S. Application Data

(60) Provisional application No. 62/381,851, filed on Aug. 31, 2016.

(51) Int. Cl.
*H03F 1/22* (2006.01)
*H03F 1/34* (2006.01)
*H04B 1/16* (2006.01)
*H04B 1/40* (2015.01)
*H04B 7/08* (2006.01)

(52) U.S. Cl.
CPC ............ *H04B 1/40* (2013.01); *H04B 7/0882* (2013.01)

(58) Field of Classification Search
CPC ... H03F 1/22; H03F 1/226; H03F 1/32; H03F 1/34; H03F 1/342; H03F 1/56; H04B 1/16
See application file for complete search history.

(56) References Cited

U.S. PATENT DOCUMENTS

| | | | |
|---|---|---|---|
| 8,203,388 B2 * | 6/2012 | Kathiresan | G06F 1/3203 330/311 |
| 2010/0194475 A1 * | 8/2010 | Okayama | H04B 1/18 330/151 |
| 2010/0301942 A1 * | 12/2010 | Hasan Abrar | H03F 1/0277 330/277 |
| 2010/0321113 A1 | 12/2010 | Kathiresan et al. | |
| 2012/0013401 A1 | 1/2012 | Jeon et al. | |
| 2012/0206150 A1 | 8/2012 | Holzer | |
| 2014/0203872 A1 | 7/2014 | Sjoland | |
| 2017/0302236 A1 * | 10/2017 | Oshita | H03F 3/2178 |

OTHER PUBLICATIONS

International Search Report dated Dec. 11, 2017 for PCT/US2017/049363.
Written Opinion dated Dec. 11, 2017 for PCT/US2017/049363.

* cited by examiner

*Primary Examiner* — Blane Jackson
(74) *Attorney, Agent, or Firm* — Chang & Hale LLP

(57) ABSTRACT

Described herein are variable gain amplifiers that selectively provide variable or tailored impedances at a degeneration block and/or feedback block depending at least in part on a gain mode of the variable gain amplifier. This advantageously reduces or eliminates performance penalties in one or more gain modes. The variable impedances can be configured to improve linearity of the amplification process in targeted gain modes. The variable gain amplifier can be configured to provide a low-loss bypass mode in a low gain mode to improve signal quality.

19 Claims, 15 Drawing Sheets

MULTI-INPUT AMPLIFIER WITH DEGENERATION SWITCHING BLOCK AND LOW LOSS BYPASS FUNCTION

CROSS-REFERENCE TO RELATED APPLICATIONS

This application claims priority to U.S. Provisional Application No. 62/381,851 filed Aug. 31, 2016 and entitled "MULTI-INPUT AMPLIFIER WITH DEGENERATION SWITCHING BLOCK AND LOW LOSS BYPASS FUNCTION," which is expressly incorporated by reference herein in its entirety for all purposes.

BACKGROUND

Field

The present disclosure relates to amplifiers for wireless communication applications.

Description of Related Art

Wireless communication devices typically include components in a front-end module that are configured to amplify received radio-frequency (RF) signals. The front-end module can include a plurality of gain modes to provide different levels of amplification.

SUMMARY

According to a number of implementations, the present disclosure relates to a variable-gain signal amplifier that includes a variable-gain stage configured to receive an input signal and generate an amplified output signal; and a degeneration switching block coupled to the variable-gain stage and configured to provide a plurality of gain levels of the variable-gain stage.

In some embodiments, the signal comprises a radio frequency signal. In some embodiments, the amplifier is configured to selectively provide a bypass path that bypasses the variable-gain stage and an amplification path that passes through the variable-gain stage.

In some embodiments, the degeneration switching block is further configured to provide tailored impedances to the variable gain stage. In further embodiments, the tailored impedances are configured to provide improved linearity in the amplified output signal relative to a variable gain stage that is not coupled to the degeneration switching block with the tailored impedances. In further embodiments, the degeneration switching block is configured to provide a first tailored impedance for a first gain level of the plurality of gain levels and a second tailored impedance for a second gain level of the plurality of gain levels. In yet further embodiments, the first tailored impedance is greater than the second tailored impedance and the first gain level is less than the second gain level.

In some embodiments, the amplifier also includes a control circuit configured to generate an amplification control signal to control the variable-gain stage and the degeneration switching circuit. In further embodiments, the control circuit is configured to provide a plurality of amplification control signals corresponding to the plurality of gain levels.

In some embodiments, the amplifier further includes a medium gain mode feedback block coupled to an input of the variable-gain stage, the medium gain mode configured to provide feedback to the variable-gain stage for a subset of the plurality of gain levels. In further embodiments, the medium gain mode feedback block and the degeneration switching block provide improved linearity to the amplified output signal relative to an amplifier without the medium gain feedback block and the degeneration switching block.

In some embodiments, the amplifier further includes a bypass block coupled to an input of the variable gain stage, the bypass block configured to be activated in a low gain level of the plurality of gain levels to provide a bypass path that does not include the variable-gain stage. In further embodiments, the bypass path does not include the degeneration switching block.

In some embodiments, the amplifier further includes a cascode buffer coupled to an output of the variable-gain stage. In some embodiments, the amplifier further includes a plurality of input nodes coupled to the variable-gain stage. In further embodiments, the amplifier is configured to receive a plurality of input signals at the plurality of input nodes, individual received signals having frequencies within different signal frequency bands. In yet further embodiments, the amplifier is configured to amplify signals received at individual input ports independent of amplification of other received signals.

According to a number of implementations, the present disclosure relates to a degeneration switching circuit that includes a variable-impedance stage coupled to a signal amplifier having various gain levels and configured to provide various impedance values associated with the various gain levels; and a switch operatively associated with the variable-impedance stage and implemented to selectively isolate the variable-impedance stage from a reference potential node.

In some embodiments, the signal amplifier is configured to amplify radio frequency signals. In some embodiments, a bypass path provided in the circuit bypasses the variable-impedance stage.

In some embodiments, the various impedance values are configured to provide improved linearity of the signal amplifier relative to a signal amplifier that is not coupled to the degeneration switching circuit with the various impedance values associated with the various gain levels. In further embodiments, the variable-impedance stage is configured to provide a first tailored impedance value for a first gain level of the various gain levels and a second tailored impedance value for a second gain level of the various gain levels.

In some embodiments, the circuit further includes a control circuit configured to generate an amplification control signal to control the variable-impedance stage and the switch. In further embodiments, the control circuit is configured to provide a plurality of amplification control signals corresponding to the various gain levels.

According to a number of implementations, the present disclosure relates to a front end architecture that includes a variable gain signal amplifier including a variable-gain stage configured to receive an input signal and generate an amplified output signal and a degeneration switching block coupled to the variable-gain stage and configured to provide a plurality of gain levels of the variable-gain stage. The front end architecture also includes a filter assembly coupled to the variable gain signal amplifier to direct frequency bands to select inputs of the variable gain signal amplifier. The front end architecture also includes a controller implemented to control the variable gain signal amplifier to provide a plurality of gain modes such that, in a low gain mode, the variable gain signal amplifier directs signals along a path that bypasses the variable-gain stage.

In some embodiments, the degeneration switching block is further configured to provide tailored impedances to the variable-gain stage. In further embodiments, the tailored impedances are configured to provide improved linearity in the amplified output signal relative to a variable gain stage that is not coupled to the degeneration switching block with the tailored impedances. In further embodiments, the degeneration switching block is configured to provide a first tailored impedance for a first gain level of the plurality of gain levels and a second tailored impedance for a second gain level of the plurality of gain levels.

According to a number of implementations, the present disclosure relates to a wireless device that includes a diversity antenna and a filter assembly coupled to the diversity antenna to receive signals and to direct frequency bands along select paths. The wireless device also includes a variable gain signal amplifier including a variable-gain stage configured to receive an input signal and generate an amplified output signal and a degeneration switching block coupled to the variable-gain stage and configured to provide a plurality of gain levels of the variable-gain stage. The wireless device also includes a controller implemented to control the variable gain signal amplifier to provide a plurality of gain modes such that, in a low gain mode, the variable gain signal amplifier directs signals along a path that bypasses the variable-gain stage.

In some embodiments, the degeneration switching block is further configured to provide tailored impedances to the variable-gain stage. In further embodiments, the tailored impedances are configured to provide improved linearity in the amplified output signal relative to a variable gain stage that is not coupled to the degeneration switching block with the tailored impedances. In further embodiments, the degeneration switching block is configured to provide a first tailored impedance for a first gain level of the plurality of gain levels and a second tailored impedance for a second gain level of the plurality of gain levels.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Overview

Figure 1:
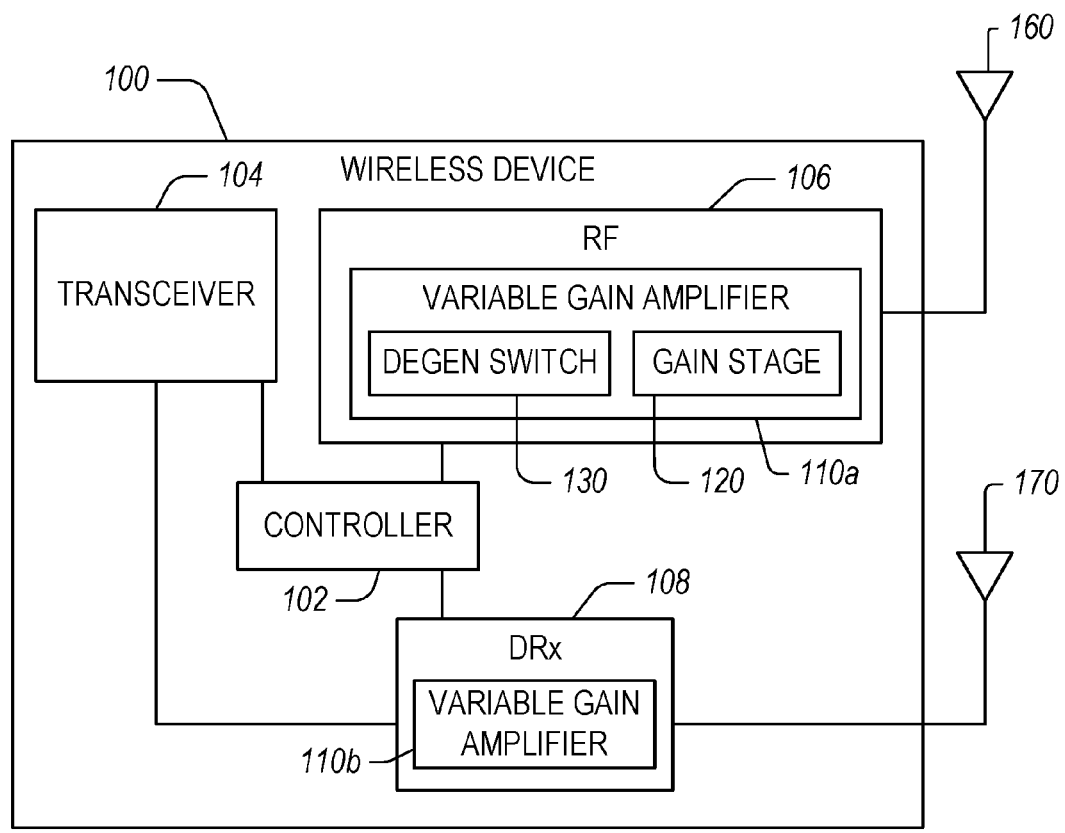
FIG. 1 illustrates a wireless device having a primary antenna and a diversity antenna.

FIG. 1 illustrates a wireless device 100 having a primary antenna 160 and a diversity antenna 170. The wireless device 100 includes an RF module 106 and a transceiver 104 that may be controlled by a controller 102. The transceiver 104 is configured to convert between analog signals (e.g., radio-frequency (RF) signals) and digital data signals. To that end, the transceiver 104 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components.

The RF module 106 is coupled between the primary antenna 160 and the transceiver 104. Because the RF module 106 may be physically close to the primary antenna 160 to reduce attenuation due to cable loss, the RF module 106 may be referred to as front-end module (FEM). The RF module 106 may perform processing on an analog signal received from the primary antenna 160 for the transceiver 104 or received from the transceiver 104 for transmission via the primary antenna 160. To that end, the RF module 106 may include filters, power amplifiers, low noise amplifiers, band select switches, attenuators, matching circuits, and other components.

When a signal is transmitted to the wireless device 100, the signal may be received at both the primary antenna 160 and the diversity antenna 170. The primary antenna 160 and diversity antenna 170 may be physically spaced apart such that the signal at the primary antenna 160 and diversity antenna 170 is received with different characteristics. For example, in one embodiment, the primary antenna 160 and the diversity antenna 170 may receive the signal with different attenuation, noise, frequency response, and/or phase shift. The transceiver 104 may use both of the signals with different characteristics to determine data bits corresponding to the signal. In some implementations, the transceiver 104 selects from between the primary antenna 160 and the diversity antenna 170 based on the characteristics, such as selecting the antenna with the highest signal-to-noise ratio. In some implementations, the transceiver 104 combines the signals from the primary antenna 160 and the diversity antenna 170 to increase the signal-to-noise ratio of the combined signal. In some implementations, the transceiver 104 processes the signals to perform multiple-input/multiple-output (MiMo) communication.

In some embodiments, the diversity antenna 170 is configured to receive signals within multiple cellular frequency bands and/or wireless local area network (WLAN) frequency bands. In such embodiments, the wireless device 100 can include a multiplexer, switching network, and/or filter assembly coupled to the diversity antenna 170 that is configured to separate the diversity signal into different frequency ranges. For example, the multiplexer can be configured to include a low pass filter that passes a frequency range that includes low band cellular frequencies, a bandpass filter that passes a frequency range that includes low band WLAN signals and mid-band and high-band cellular signals, and a high pass filter that passes a frequency range that includes high-band WLAN signals. This example is merely for illustrative purpose. As another example, the multiplexer can have a variety of different configurations such as a diplexer that provides the functionality of a high pass filter and a low pass filter.

Because the diversity antenna 170 is physically spaced apart from the primary antenna 160, the diversity antenna 170 can be coupled to the transceiver 104 by a transmission line, such as a cable or a printed circuit board (PCB) trace. In some implementations, the transmission line is lossy and attenuates the signal received at the diversity antenna 170 before it reaches the transceiver 104. Thus, in some implementations, gain is applied to the signal received at the diversity antenna 170. The gain (and other analog processing, such as filtering) may be applied by the diversity receiver module 108. Because such a diversity receiver module 108 may be located physically close to the diversity antenna 170, it may be referred to a diversity receiver front-end module, examples of which are described in greater detail herein.

The RF module 106 and the diversity receiver module 108 include variable gain amplifiers 110*a*, 110*b* configured to provide a plurality of gain modes to amplify signals from the primary antenna 160 and the diversity antenna 170, respectively. Each variable gain amplifier 110*a*, 110*b* can include a gain stage 120 and a degeneration switching block 130 that changes inductance based at least in part on a gain mode of the variable gain amplifier 110*a*, 110*b*. Signals received at the variable gain amplifiers 110*a*, 110*b* can be amplified using the gain stage 120 or the signals can be allowed to bypass the gain stage 120, as described in greater detail herein. The selected inductance of the degeneration switching block 130, the bypass path, and/or the gain mode of the variable gain amplifier 110*a*, 110*b* can be controlled by the controller 102. The degeneration switching block 130 can be configured to change inductance to increase performance of the variable gain amplifier 110*a*, 110*b* relative to an amplifier with fixed inductance. Performance can be increased by increasing linearity and/or by reducing noise introduced during amplification, for example. The variable gain amplifier 110*a*, 110*b* can receive multiple input signals and output a single signal or a plurality of output signals. In certain implementations, individual inputs can have corresponding individual degeneration switching blocks to improve input isolation between input ports.

Advantageously, the architecture of the variable gain amplifier 110*a*, 110*b* can provide for multi-input processing without the use of a switch. The variable gain amplifier 110*a*, 110*b* can advantageously achieve targeted or improved linearity by using a switchable degeneration block with tailored inductances. The variable gain amplifier 110*a*, 110*b* can provide targeted or improved input to output isolation through the use of a shunt switch in the bypass path. The variable gain amplifier 110*a*, 110*b* can provide a low-loss direct bypass mode in particular gain modes, such as a low gain mode.

The controller 102 can be configured to generate and/or send control signals to other components of the wireless device 100. In some embodiments, the controller 102 provides signals based at least in part on specifications provided by the mobile industry processer interface alliance (MIPI® Alliance). The controller 102 can be configured to receive signals from other components of the wireless device 100 to process to determine control signals to receive to other components. In some embodiments, the controller 102 can be configured to analyze signals or data to determine control signals to send to other components of the wireless device 100. The controller 102 can be configured to generate control signals based on gain modes provided by the wireless device 100. For example, the controller 102 can send control signals to the variable gain amplifiers 110*a*, 110*b* to control the gain mode. Similarly, the controller 102 can be configured to generate control signals to select inductances of the degeneration switching block 130. The controller can be configured to generate control signals to control the variable gain amplifier 110*a*, 110*b* to provide a bypass path.

In some implementations, the controller 102 generates amplifier control signal(s) based on a quality of service metric of an input signal received at the input. In some implementations, the controller 102 generates the amplifier control signal(s) based on a signal received from a communications controller, which may, in turn, be based on a quality of service (QoS) metric of the received signal. The QoS metric of the received signal may be based, at least in part, on the diversity signal received on the diversity antenna 170 (e.g., an input signal received at the input). The QoS metric of the received signal may be further based on a signal received on a primary antenna 160. In some implementations, the controller 102 generates the amplifier control signal(s) based on a QoS metric of the diversity signal without receiving a signal from the communications controller. In some implementations, the QoS metric includes a signal strength. As another example, the QoS metric may include a bit error rate, a data throughput, a transmission delay, or any other QoS metric. In some implementations, the controller 102 controls the gain (and/or current) of the amplifiers in the variable gain amplifiers 110*a*, 110*b*. In some implementations, the controller 102 controls the gain of other components of the wireless device based on an amplifier control signal.

In some implementations, the variable gain amplifiers 110*a*, 110*b* may include a step-variable gain amplifier configured to amplify received signals with a gain of one of a plurality of configured amounts indicated by an amplifier control signal. In some implementations, the variable gain amplifiers 110a, 110b may include a continuously-variable gain amplifier configured to amplify received signals with a gain proportional to or dictated by the amplifier control signal. In some implementations, the variable gain amplifiers 110a, 110b may include a step-variable current amplifier configured to amplify received signals by drawing a current of one of plurality of configured amounts indicated by the amplifier control signal. In some implementations, the variable gain amplifiers 110a, 110b may include a continuously-variable current amplifier configured to amplify received signals by drawing a current proportional to the amplifier control signal.

Figure 2:
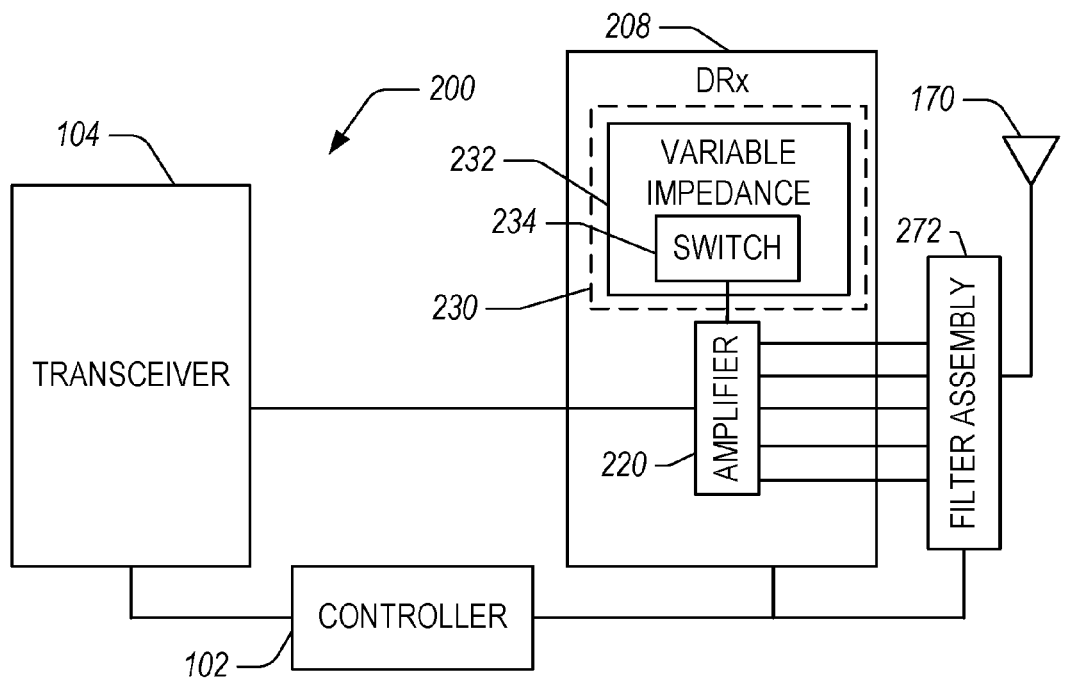
FIG. 2 illustrates a diversity receiver (DRx) configuration including a DRx front-end module (FEM).

FIG. 2 illustrates a diversity receiver (DRx) configuration 200 including a DRx front-end module (FEM) 208. The DRx configuration 200 includes a diversity antenna 170 that is configured to receive a diversity signal and provide the diversity signal to the DRx FEM 150 through a filter assembly 272. The filter assembly 272 can include a multiplexer, for example, that is configured to selectively direct signals within targeted frequency ranges along respective paths to a multi-input amplifier 220 that is coupled to a degeneration switching circuit 230. The signals can be radio frequency (RF) signals that include, for example and without limitation, cellular signals (e.g., low-, mid-, high- and/or ultra-high-band cellular frequencies), WLAN signals, BLUETOOTH® signals, GPS signals, and the like.

The DRx FEM 208 is configured to perform processing on the diversity signals received from the filter assembly 272. For example, the DRx FEM 208 may be configured to filter the diversity signals to one or more active frequency bands that can include cellular and/or WLAN frequency bands. The controller 102 can be configured to control the DRx FEM 208 to selectively direct signals to targeted filters to accomplish the filtering. As another example, the DRx FEM 208 may be configured to amplify one or more of the filtered signals using the amplifier 220. To that end, the DRx FEM 208 may include filters, low-noise amplifiers, band select switches, matching circuits, and other components. The controller 102 can be configured to interact with components in the DRx FEM 208 to intelligently select paths for the diversity signals through the DRx FEM 208.

The DRx FEM 208 transmits at least a portion of the processed diversity signals to the transceiver 104. The transceiver 104 may be controlled by the controller 102. In some implementations, the controller 102 may be implemented within the transceiver 104.

The DRx FEM 208 can be configured to provide a plurality of gain modes. For the plurality of gain modes, different inductances can be provided by a variable impedance stage 232 of the degeneration switching circuit 230. In one or more gain modes, a switch 234 of the variable impedance stage 232 can be configured to select an impedance (e.g., an inductance) that is coupled to the amplifier 220. This can be done to improve linearity of the amplification process, for example. These selectable impedances can be embedded onto a multi-input amplifier architecture.

In some embodiments, utilization of selectable impedances coupled to an amplification stage, e.g., an LNA, can provide improved linearity and/or IIP3. The variable impedance stage 232 with the switch 234 can beneficially allow the amplifier 220 to be coupled to a desired or targeted impedance for particular gain modes and/or signal amplitudes. In some embodiments, the DRx configuration 200 is configured to bypass amplification when operating in a low gain mode and to amplify signals with the amplifier 220 when operating in other gain modes. This can advantageously allow the DRx configuration 200 to improve linearity in particular gain modes.

In some embodiments, the amplifier 220 is configured to receive a plurality of input signals and provide a single output signal. In certain embodiments, the amplifier 220 can be configured to receive a plurality of input signals and provide a corresponding plurality of output signals. The filter assembly 272 can be configured to direct signals corresponding to particular frequency bands along designated paths to the amplifier 220. In certain implementations, the amplifier 220 can provide different gain modes for the received signals. The variable impedance stage 232 can select different impedances using the switch 234 to couple to the amplifier 220, the selected impedances based at least in part on the gain mode of the amplifier 220. In certain implementations, the amplifier 220 can operate in a bypass configuration such that the signal passes through a bypass path and in an amplification configuration such that the signal passes through an amplification path with a selected impedance provided by the variable impedance stage 232. This can advantageously allow the DRx FEM 208 to provide variable gain and/or a plurality of gain modes while reducing the negative impacts on linearity (e.g., IIP3) and/or noise factor (NF) relative to configurations that do not selectively provide bypass paths and/or variable impedances. The amplifier 220 can include any suitable amplifier circuit configured to provide a desired or targeted amplification. In some embodiments, the amplifier 220 includes a low-noise amplifier (LNA) circuit configured to amplify signals from a plurality of frequency bands (e.g., cellular frequency bands and/or WLAN frequency bands) received at a plurality of inputs, or a multi-input LNA. However, it is to be understood that the embodiments described herein are not to be limited to implementations that utilize low-noise amplifiers but include implementations that use any of a variety of amplifiers.

The amplifier 220 can be configured to amplify signals based at least in part on a plurality of gain modes. For example, the amplifier 220 can be configured to provide a first amplification or gain for a first gain mode, a second amplification or gain for a second gain mode, and so on. The amplifier 220 can be controlled by the controller 102 to control the gain provided at the amplifier 220. For example, the controller 102 can provide a signal indicative of a desired or targeted gain to the amplifier 220 and the amplifier 220 can provide the targeted gain. The controller 102 may receive an indication of the targeted gain from another component in a wireless device, for example, and control the amplifier 220 based at least in part on that indication. Similarly, the degeneration switching circuit 230 can be controlled based at least in part on a gain mode and/or targeted gain of the amplifier 220.

The controller 102 can be configured to control the DRx FEM 208 to selectively provide tailored impedances. For example, the controller 102 and the DRx FEM 208 can control the variable impedance stage 232 to configure the switch 234 to provide a targeted impedance based at least in part on a gain mode. As another example, the controller 102 and the DRx FEM 208 can control the amplifier to provide a bypass path based at least in part on a gain mode. As another example, the controller 102 and the DRx FEM 208 can use the amplifier 220 to provide a plurality of gain modes.

Example Architectures of Variable Gain Amplifiers

Front end modules generally include amplifiers such as low-noise amplifiers (LNAs) to amplify received signals. In wireless devices that provide a variety of gain modes, it may be advantageous to selectively provide variable or tailored impedance at a gain stage to improve performance. Similarly, for at least one gain mode, it may be advantageous to bypass a gain stage to improve performance (e.g., improve linearity).

Accordingly, provided herein are variable gain amplifiers that selectively provide variable or tailored impedances at a degeneration block and/or feedback block depending at least in part on a gain mode of the variable gain amplifier. This advantageously reduces or eliminates performance penalties in one or more gain modes. Furthermore, the variable impedances can be configured to improve linearity of the amplification process in targeted gain modes. Similarly, the variable gain amplifier can be configured to provide a low-loss bypass mode in a low gain mode to improve signal quality.

Figure 3A:
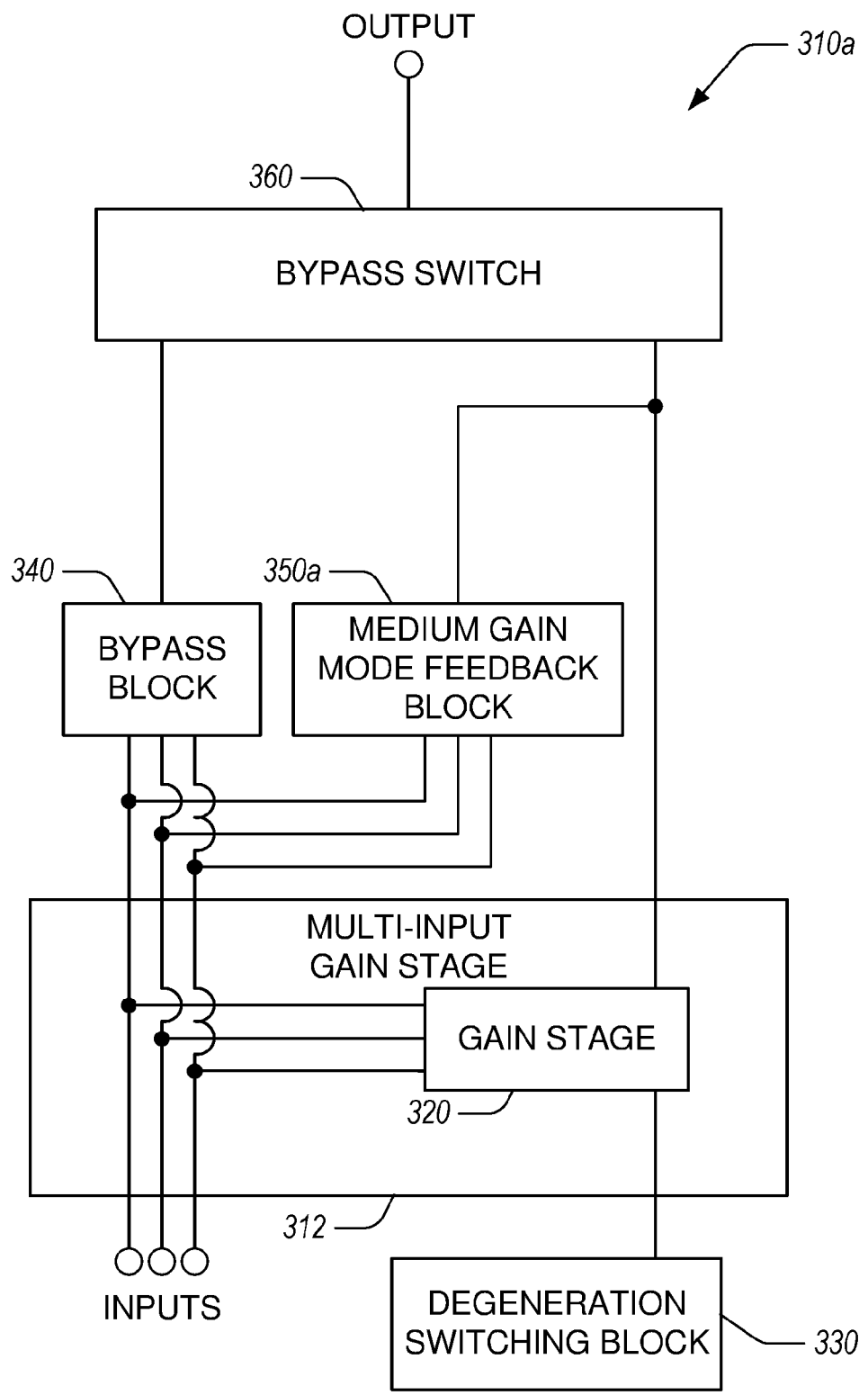
FIG. 3A illustrates an example variable gain amplifier configuration that includes a multi-input gain stage configured to receive multiple inputs and to selectively amplify the received signals with the gain stage or to provide a bypass path through a bypass block.

FIG. 3A illustrates an example variable gain amplifier configuration 310a that includes a multi-input gain stage 312 configured to receive multiple inputs and to selectively amplify the received signals with the gain stage 320 or to provide a bypass path through a bypass block 340. The gain stage 320 is coupled to a degeneration switching block 330 that is configured to selectively provide tailored impedances based at least in part on a gain mode of the variable gain amplifier configuration 310a. In certain implementations, the multi-input gain stage 312 is configured to receive multiple signals at distinct input ports, each distinct input port configured to receive signals at one or more particular cellular frequency bands. For example, a signal in a first band can be received at a first input port, a signal in a second band can be received at a second input port, and a signal in a third band can be received at a third input port.

The variable gain amplifier 310a can be configured to provide multi-input processing without the use of a switching network. The variable gain amplifier 310a can be configured to achieve relatively high linearity through the use of the degeneration switching block 330. In certain implementations, the bypass block 340 includes a shunt switch that can provide high input to output isolation relative to configurations with such a switch. The variable gain amplifier 310a can be configured to provide a low-loss direct bypass mode by directing signals from the input through the bypass block 340 and not the gain stage 320. The low-loss direct bypass mode can be implemented in a low gain mode, for example.

The variable gain amplifier 310a includes the multi-input gain stage 312 that provides a voltage to current gain stage 320. The multi-input gain stage 312 can be configured to provide isolation between inputs. In some embodiments, the variable gain amplifier 310a can include a degeneration switching block 330 for each input to further isolate the inputs.

The degeneration switching block 330 is configured to provide impedance to the gain stage 320 input. This can improve performance by providing power and/or noise matching with prior stages in the processing chain. The degeneration switching block 330 can be configured to improve linearity of the gain stage 320 by providing a feedback mechanism. In some embodiments, the degeneration switching block 330 is configured to provide a first impedance for a first gain mode and a second impedance for a second gain mode. The selected impedances provided by the degeneration switching block 330 can also be configured to improve linearity of the gain stage 320. The variable gain amplifier 310a can be configured to bypass the degeneration switching block 330 in a bypass mode. This can improve linearity performance by reducing or minimizing leakage current passing through the gain stage 320.

The bypass block 340 is configured to receive signals from the multiple inputs and to provide a path to the output that does not pass through the gain stage 320 or the degeneration switching block 330. The bypass block 340 can include components that serve to isolate the input and output in one or more of the gain modes provided by the variable gain amplifier 310a.

The medium gain mode feedback block 350a is configured to be activated for a subset of the gain modes provided by the variable gain amplifier 310a. The medium gain mode feedback block 350a is configured to provide targeted impedances for the input signals. This can help to improve linearity of the amplification process. The medium gain mode feedback block 350a can also be configured to control feedback within the variable gain amplifier 310a. The medium gain mode feedback block 350a can be configured to provide functionality similar to including a second degeneration block in the circuit.

The bypass switch 360 is configured to selectively provide a path from the inputs through the bypass block 340 to the output or a path from the inputs through the gain stage 320 to the output. The bypass switch 360 can include one or more switching elements to isolate and/or to select the desired path based at least in part on a gain mode of the variable gain amplifier 310a.

In certain embodiments, the variable gain amplifier 310a can be configured to provide a plurality of gain modes, e.g., gain modes G0, G1, . . . , GN with G0 being the highest gain and GN being a bypass mode. When operating in gain mode GN, the variable gain amplifier 310a can be configured to direct signals from the inputs to the bypass block 340. When operating in gain modes G0 to GN−1, the variable gain amplifier 310a can be configured to direct signals through the gain stage 320 and to activate the degeneration switching block 330. The degeneration switching block 330 can be configured to provide different impedance levels for individual gain modes or for groups of gain modes. Even in these gain modes, the bypass block 340 may be at least partially activated by activating a shunt switch in the bypass block 340 to provide isolation between the inputs and the output. The variable gain amplifier 310a can be configured to activate the medium gain mode feedback block 350a for one or more of the gain modes G0 to GN−1

The variable gain signal amplifier 310a can be configured to achieve relatively low noise and high linearity (e.g., higher IIP3) relative to amplifiers without the disclosed medium gain mode feedback block 350a, bypass block 340, degeneration switching block 330. The variable gain signal amplifier 310a can be configured to amplify radio frequency (RF) signals such as cellular signals, WLAN signals, BLUETOOTH® signals, GPS signals, and the like. The variable gain signal amplifier 310a can be configured to provide broadband capabilities by receiving signals over a plurality of frequency bands at the multiple inputs and processing these signals. The variable gain signal amplifier 310a can be configured to independently process signals at the respective inputs. The variable gain signal amplifier 310a can be configured to be controlled by a control circuit assembly, such as a controller (e.g., the controller 102 described herein with reference to FIGS. 1 and 2). The control circuit assembly can intelligently and selectively switch paths between an amplification path and a bypass path and can selectively provide impedances with the degeneration switching block 330.

It is to be understood that although three inputs are illustrated, the variable gain amplifier 310a can include any suitable number of inputs. For example and without limitation, the variable gain amplifier 310a can include at least 2 inputs, at least 4 inputs, at least 8 inputs, at least 16 inputs, at least 32 inputs, at least 64 inputs, or at least any number of inputs in the described ranges. As another example and without limitation, the variable gain amplifier 310a can include less than or equal to 64 inputs, less than or equal to 32 inputs, less than or equal to 16 inputs, less than or equal to 8, less than or equal to 4 inputs, or less than or equal to any number of inputs in the described ranges.

Figure 3B:
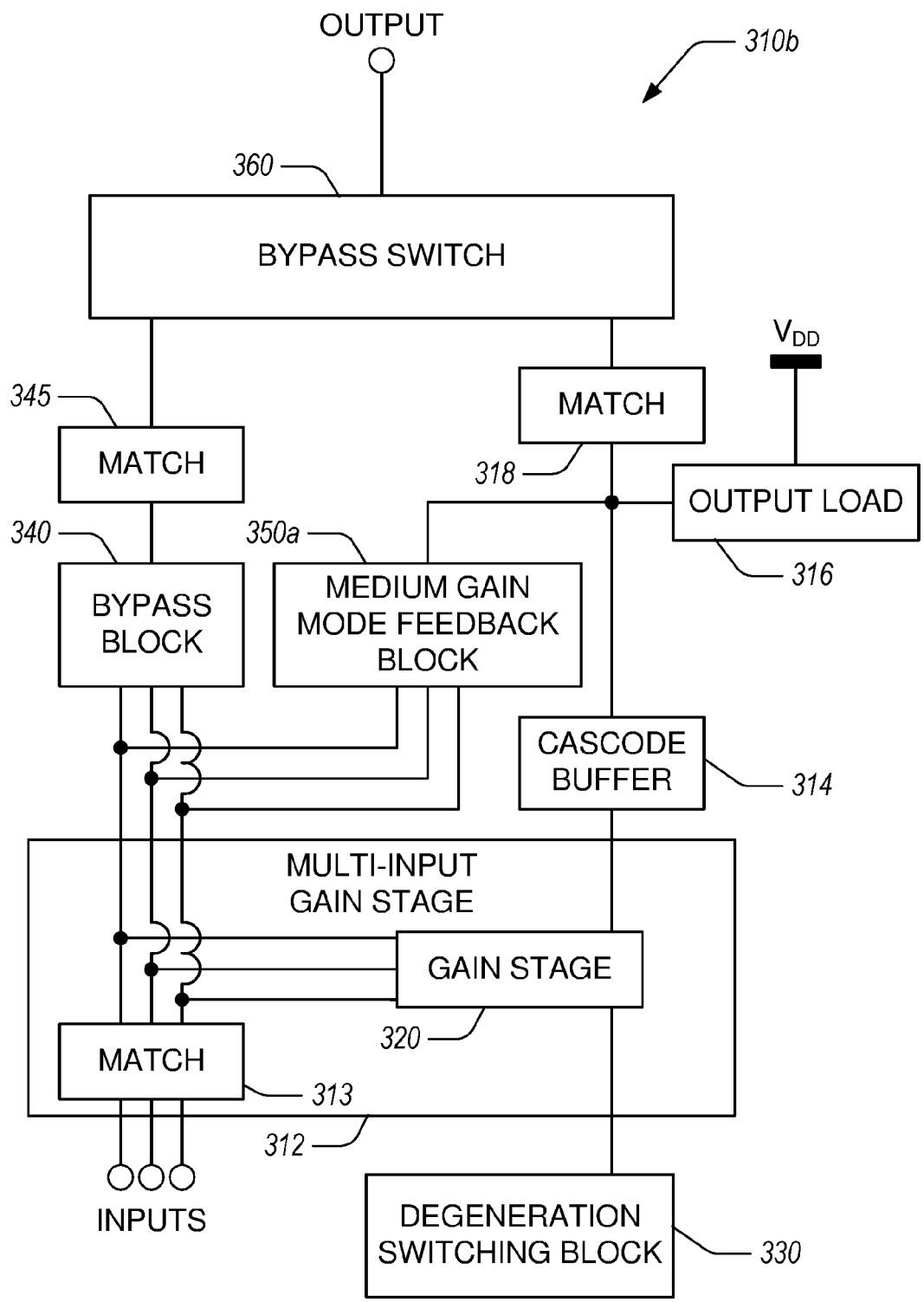
FIG. 3B illustrates another example variable gain amplifier that includes the same components as the variable gain amplifier of FIG. 3A, with the addition of certain elements.

FIG. 3B illustrates another example variable gain amplifier 310b that includes the same components as the variable gain amplifier 310a of FIG. 3A, with the addition of certain elements. For example, the variable gain amplifier 310b includes matching networks 313, 318, and 345. The input matching network 313 is configured to provide impedance matching for the signals received at the inputs. The output matching network 318 is similarly configured to provide impedance matching for an output load 316 and the amplifier comprising the gain stage 320 and a cascode buffer 314. The bypass matching network 345 similarly provides impedance matching for the bypass block 340. For the matching networks 313, 318, 345, any suitable combination of inductors and capacitors can be used to provide the targeted impedances.

The variable gain amplifier 310b also includes the output load 316 and cascode buffer 314 as part of the amplification chain. The cascode buffer 314 can be configured to act as a current buffer. The cascode buffer 314 is configured to provide isolation between the gain stage 320 and the output. The cascode buffer 314 can also be configured to improve the gain of the variable gain amplifier 310b. The output load 316 is configured to provide a load to current to generate an output voltage swing. The output load 316 can be configured to be tuned or tunable for each band received at the inputs. The output load 316 can be configured to improve return loss and/or increase bandwidth by tailoring the resistance of the output load 316. The voltage VDD can be configured to set the gain mode of the variable gain amplifier 310b. For example, the voltage VDD can be configured so that a lower current flowing through the output load 316 corresponds to a lower gain of the variable gain amplifier 310b.

Figure 3C:
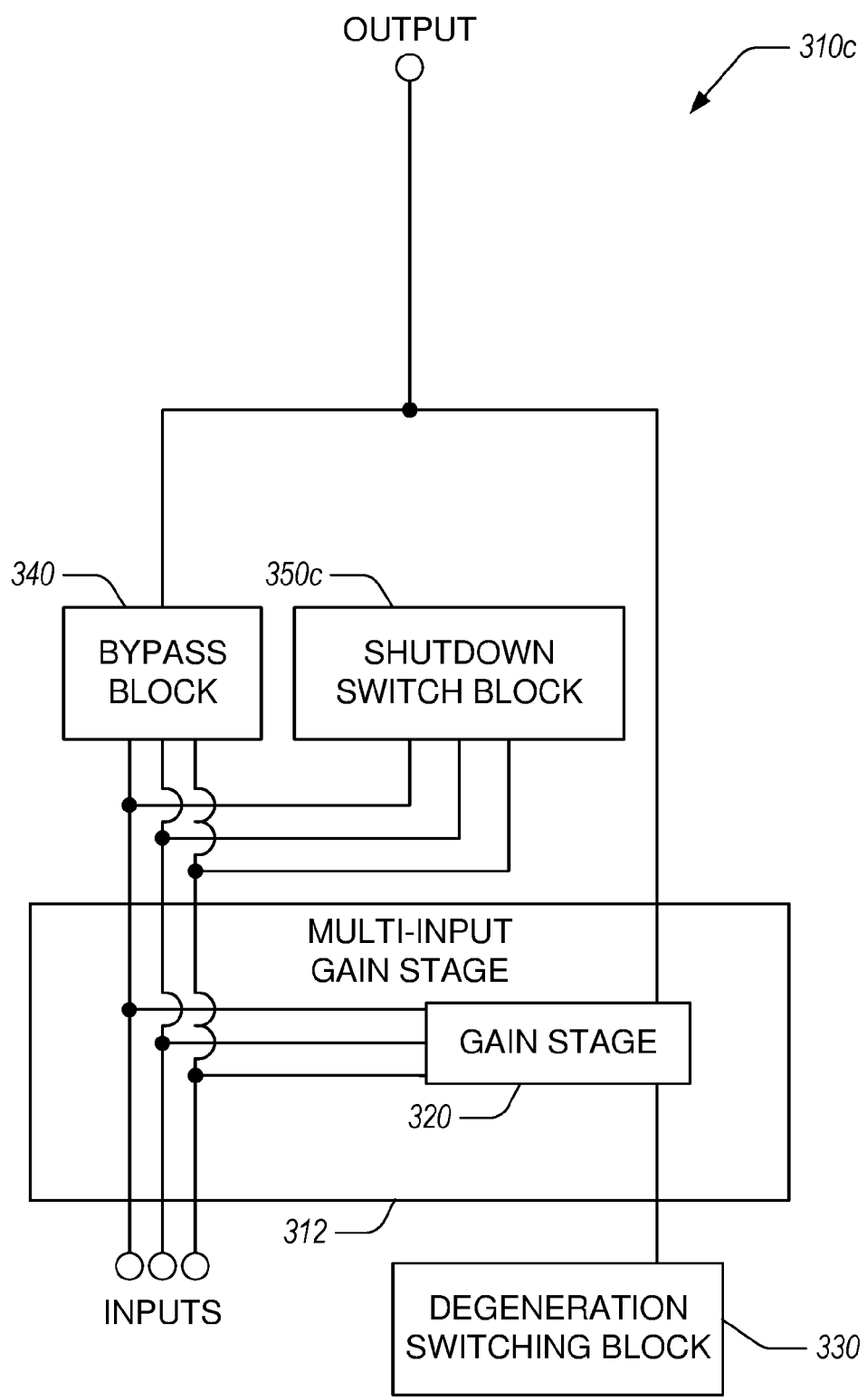
FIG. 3C illustrates another example variable gain amplifier that is similar to the variable gain amplifier of FIG. 3A, with the removal of the bypass switch.

FIG. 3C illustrates another example variable gain amplifier 310c that is similar to the variable gain amplifier 310a of FIG. 3A, with the removal of the bypass switch 360. Without the bypass switch 360, the output of the bypass block 340 is coupled to the output of the output of the gain stage 320. Furthermore, the medium gain mode feedback block is replaced with a shutdown switch block 350c that is not coupled to the output as in the variable gain amplifier 310a of FIG. 3A. Instead, the shutdown switch block 350c is configured to selectively isolate input nodes to reduce leakage in the amplifier 310c. In some embodiments, this can be achieved by activating a switch between an input node and a reference potential node when the input is not being used. In various implementations, the switch can couple the input node to a reference potential node through a capacitive element.

Figure 3D:
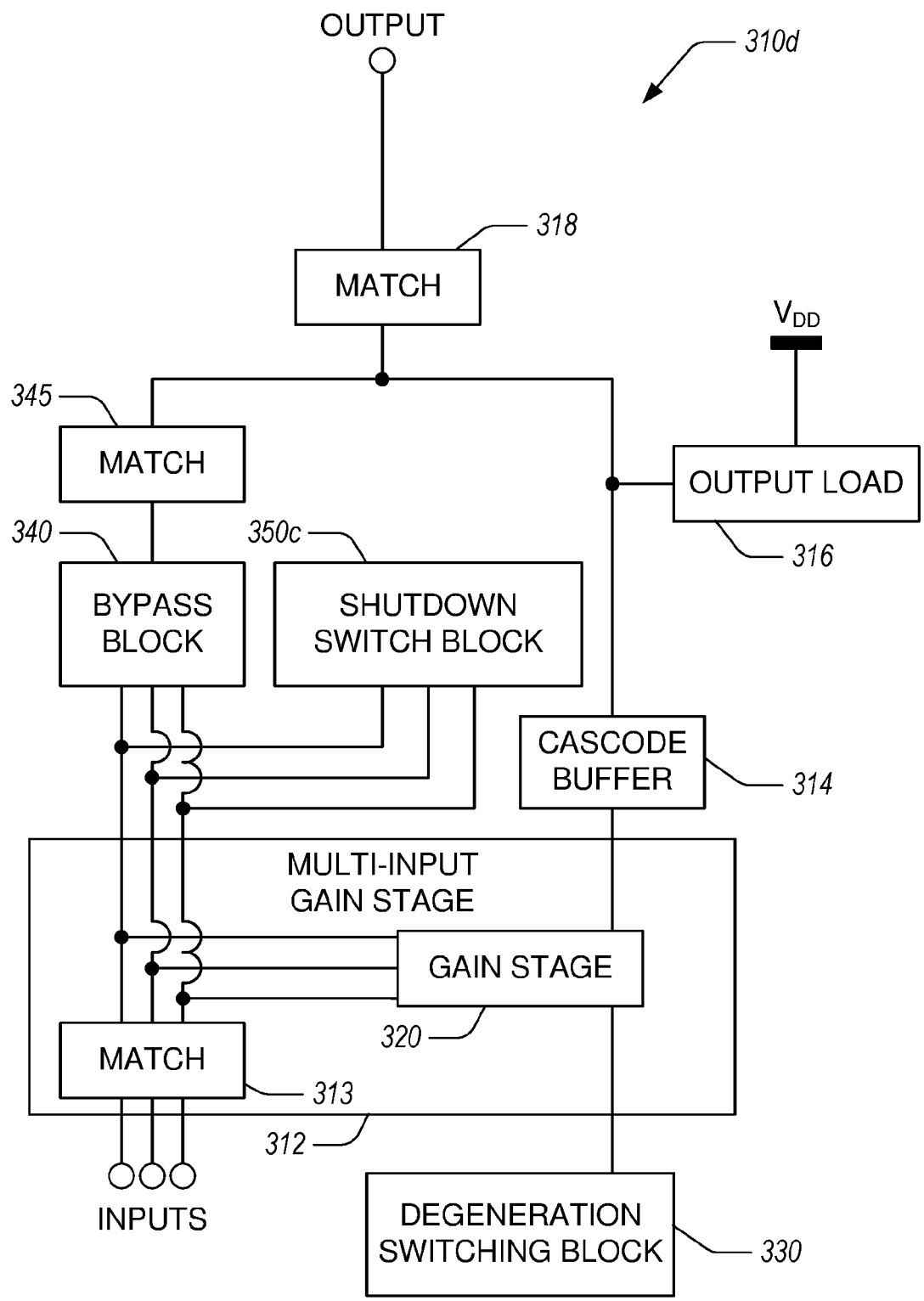
FIG. 3D illustrates another example variable gain amplifier that includes the same components as the variable gain amplifier of FIG. 3C, with the addition of certain elements.

FIG. 3D illustrates another example variable gain amplifier 310d that includes the same components as the variable gain amplifier 310c of FIG. 3C, with the addition of certain elements. For example, the variable gain amplifier 310d includes matching networks 313, 318, and 345. The input matching network 313 is configured to provide impedance matching for the signals received at the inputs. The output matching network 318 is similarly configured to provide impedance matching for an output load 316 and the amplifier comprising the gain stage 320 and a cascode buffer 314. The bypass matching network 345 similarly provides impedance matching for the bypass block 340. For the matching networks 313, 318, 345, any suitable combination of inductors and capacitors can be used to provide the targeted impedances.

The variable gain amplifier 310d also includes the output load 316 and cascode buffer 314 as part of the amplification chain. The cascode buffer 314 can be configured to act as a current buffer. The cascode buffer 314 is configured to provide isolation between the gain stage 320 and the output. The cascode buffer 314 can also be configured to improve the gain of the variable gain amplifier 310d. The output load 316 is configured to provide a load to current to generate an output voltage swing. The output load 316 can be configured to be tuned or tunable for each band received at the inputs. The output load 316 can be configured to improve return loss and/or increase bandwidth by tailoring the resistance of the output load 316. The voltage VDD can be configured to set the gain mode of the variable gain amplifier 310d. For example, the voltage VDD can be configured so that a lower current flowing through the output load 316 corresponds to a lower gain of the variable gain amplifier 310d.

Figure 4:
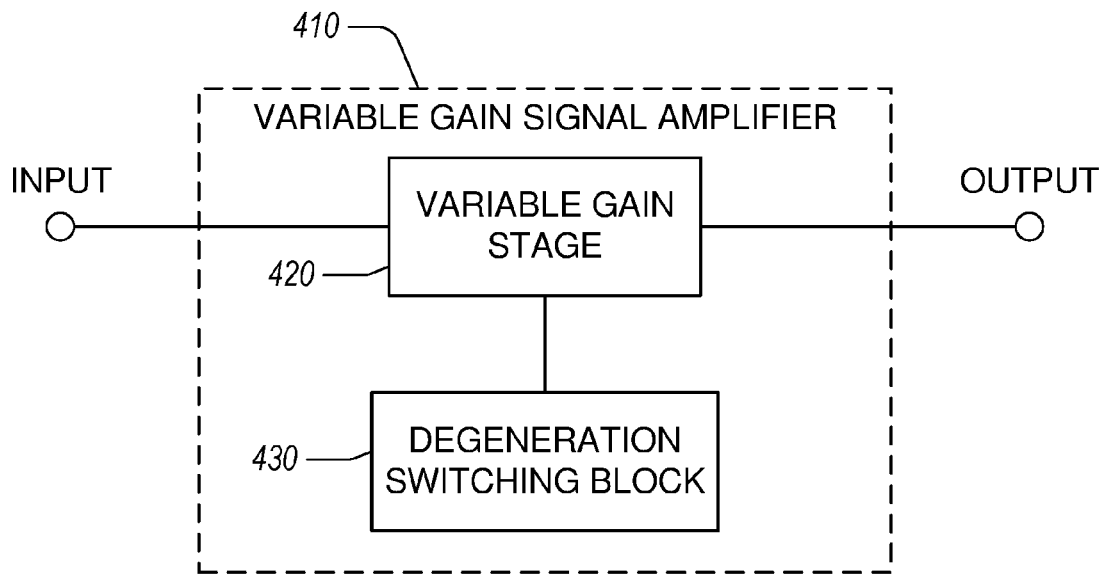
FIG. 4 illustrates a variable-gain signal amplifier that includes a variable-gain stage configured to receive an input signal and to generate an amplified output signal.

FIG. 4 illustrates a variable-gain signal amplifier 410 that includes a variable-gain stage 420 configured to receive an input signal and to generate an amplified output signal. The variable-gain signal amplifier 410 also includes a degeneration switching block 430 coupled to the variable-gain stage 420. The degeneration switching block 430 can be configured to provide a plurality of different gain levels of the variable-gain stage 420.

Figure 5:
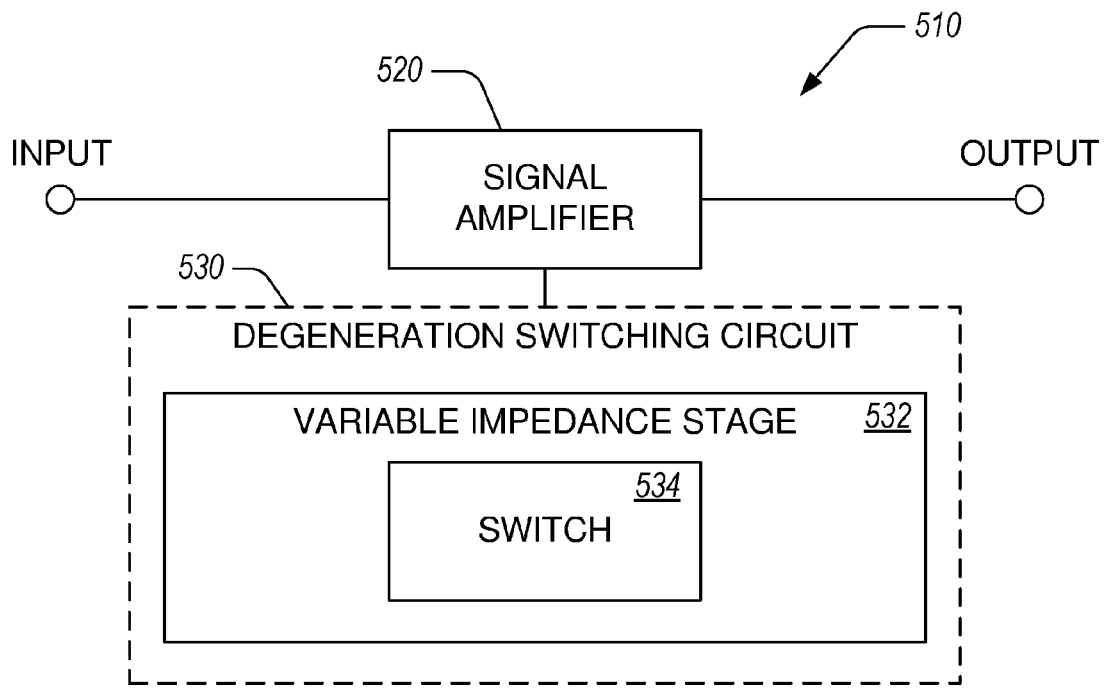
FIG. 5 illustrates a degeneration switching circuit that includes a variable-impedance stage coupled to a signal amplifier having various gain levels.

FIG. 5 illustrates a degeneration switching circuit 530 that includes a variable-impedance stage 532 coupled to a signal amplifier 520 having various gain levels. The variable-impedance stage 532 can be configured to provide various impedance values associated with the various gain levels. The degeneration switching circuit 530 includes a switch 534 operatively associated with the variable-impedance stage 532 and implemented to selectively isolate the variable-impedance stage 532 from a reference potential node.

Figure 6:
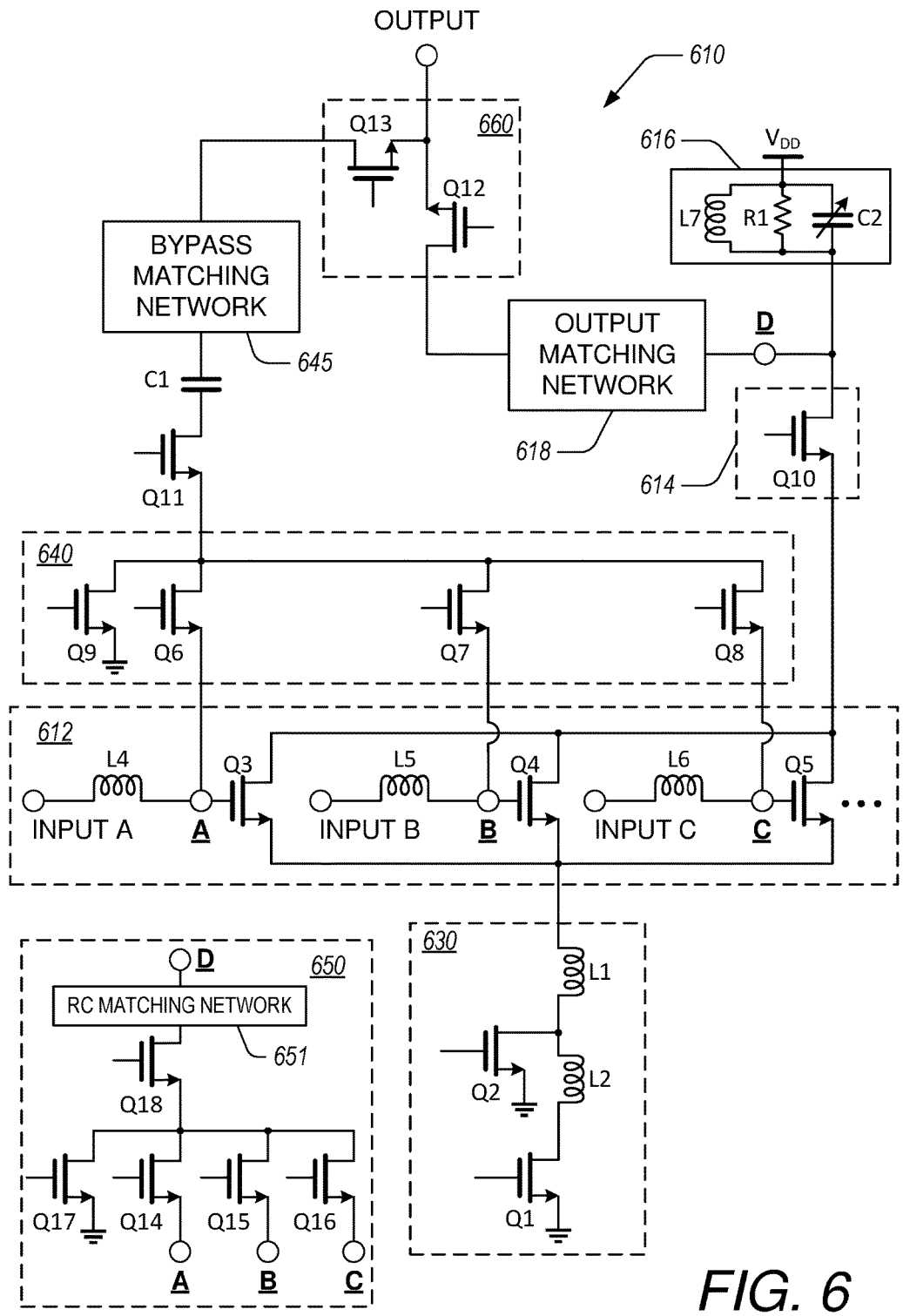
FIG. 6 illustrates an example variable gain amplifier configuration that is configured similarly to the variable gain amplifier of FIG. 3B.

FIG. 6 illustrates an example variable gain amplifier configuration 610 that is configured similarly to the variable gain amplifier 310b described herein with reference to FIG. 3B. The variable gain amplifier 610 includes example electrical components to demonstrate an example implementation of the amplifier. It is to be understood, however, that this is merely an illustrative example implementation and the scope of the disclosure extends to additional implementations encompassing similar architectures.

The variable gain amplifier configuration 610 includes a multi-input gain stage 612 configured to receive inputs A, B, and C and to selectively amplify the received signals with corresponding transistors Q3, Q4, and Q5 in conjunction with the cascode buffer 614 with the transistor Q10. The multi-input gain stage 612 is also configured to provide a bypass path through a bypass block 340 that includes switching transistors Q6, Q7, and Q8 for the respective inputs A, B, and C.

The multi-input gain stage 612 is coupled to a degeneration switching block 630 that is configured to selectively provide tailored impedances based at least in part on a gain mode of the variable gain amplifier configuration 610. In certain implementations, the multi-input gain stage 612 is configured to receive multiple signals at distinct input ports, each distinct input port configured to receive signals at one or more particular cellular frequency bands. For example, input A receives a signal in a first band, input B receives a signal in a second band, and input C receives a signal in a third band. In some embodiments, each of the transistors Q3, Q4, and Q5 can be coupled to a dedicated degeneration switching block 630 to increase isolation between input ports. The inputs are coupled respectively to inductors L4, L5, and L6 to provide input impedance matching.

The variable gain amplifier configuration 610 can be configured to provide multi-input processing without the use of a switching network. The variable gain amplifier configuration 610 can be configured to achieve relatively high linearity through the use of the degeneration switching block 630. In certain implementations, the bypass block 640 includes a shunt switch Q9 that can provide high input to output isolation relative to configurations with such a switch. The variable gain amplifier configuration 610 can be configured to provide a low-loss direct bypass mode by directing signals from the inputs through the bypass block 640. The low-loss direct bypass mode can be implemented in a low gain mode, for example.

The variable gain amplifier configuration 610 includes the multi-input gain stage 312 that provides a voltage to current gain stage comprising the transistors Q3-Q5. The multi-input gain stage 312 is configured to provide a voltage to current gain stage. Further, the multi-input gain stage 312 is configured to amplify respective input signals in conjunction with the cascode buffer 614 that includes the transistor Q10, the cascode buffer 614 configured to acts as a current buffer to lower input impedance and increase output impedance.

The degeneration switching block 630 is configured to provide impedance to the gain stage of the multi-input gain stage 612. This can improve performance by providing power and/or noise matching with prior stages in the processing chain. The degeneration switching block 630 can be configured to improve linearity of the gain stage (e.g., transistors Q3-Q5) by providing a feedback mechanism. The degeneration switching block 630 can be configured to provide a first impedance L1 for a first gain mode and a second impedance provided by L1 and L2 for a second gain mode by respectively activating the transistor Q2 and the transistor Q1. The selected impedances provided by the degeneration switching block 630 can also be configured to improve linearity of the gain stage. The variable gain amplifier configuration 610 can be configured to bypass the degeneration switching block 630 in a bypass mode. This can improve linearity performance by reducing or minimizing leakage current passing through the gain stage. In certain implementations, the degeneration switching block 630 can be configured to provide a lower inductance for higher gain modes. The amount of inductance provided by the degeneration switching block 630 can change with changes in gain mode of the variable gain amplifier configuration 610.

The bypass block 640 is configured to receive signals from the multiple inputs and to provide a path to the output that does not pass through the gain stage (e.g., transistors Q3-Q5) or the degeneration switching block 630. The bypass block 640 is configured to provide a single path to the output through transistor Q11 and capacitor C1. The capacitor C1 can be configured to block direct current (DC) voltages from an output supply. The bypass block 640 also includes a shunt switch through transistor Q9 that selectively couples the bypass block 640 to a reference potential node to aid in isolating the inputs from the output. A bypass matching network 645 can provide additional impedance matching flexibility.

The medium gain mode feedback block 650 is configured to be activated for a subset of the gain modes provided by the variable gain amplifier configuration 610. The medium gain mode feedback block 650 is configured to provide targeted impedances for the input signals. This can help to improve linearity of the amplification process. An RC matching network 651 can be used to control the amount of feedback in the system. Furthermore, the RC matching network 651 can be configured to function as a block for DC voltages. The RC matching network 651 can be configured to control feedback behavior in amplitude and phase. The RC matching network 651 can include a capacitor, a resistor, a capacitor and resistor in series, or any suitable combination of capacitors, resistors, and other components. The medium gain mode feedback block 650 can also be configured to control feedback within the variable gain amplifier 610. The medium gain mode feedback block 650 can be configured to provide functionality similar to including a second degeneration block in the circuit.

When activated, signals from respective inputs A, B, and C enter the medium gain feedback block 650 at points A̲, B̲, and C̲ and exit the block at point D̲. This point D̲ is coupled to the circuit prior to an output matching network 618 and a bypass switch 660. In other words, the medium gain mode feedback block 650 couples the respective inputs A, B, and C to the output through transistors Q14-Q16 and Q18. The additional transistor Q17 can be configured to provide a shunt switch to a reference potential node, similar to the bypass block 640. The point D̲ can be positioned prior to the output matching network 618, within the output matching network 618, or after the output matching network 618. Because the medium gain mode feedback block 650 can be configured to generate a cancellation between the input and the output, the point D̲ can be positioned within the variable gain amplifier configuration 610 to improve performance.

The bypass switch 660 is configured to selectively provide a path from the inputs A, B, and C through the bypass block 640 to the output or a path from the inputs A, B, and C through the gain stage and amplifier elements (e.g., the cascode buffer 614 and the output matching network 618) to the output. The bypass switch 660 includes a transistor Q12 that controls connection of an amplification path to the output and a transistor Q13 that controls connection of a bypass path to the output. The bypass switch 660 can be controlled based at least in part on a gain mode of the variable gain amplifier 610.

The matching networks 618 and 645 can include any suitable combination of inductors and capacitors can be used to provide the targeted impedances. The output matching network 618 is configured to provide impedance matching for an output load 616 and the amplifier comprising the gain stage (e.g., transistors Q3-Q5) and the cascode buffer 614. The bypass matching network 645 similarly provides impedance matching for the bypass block 640.

The variable gain amplifier 610 includes the output load 616 and cascode buffer 614 as part of the amplification path. The cascode buffer 614 includes the transistor Q10 that is configured to act as a current buffer. The cascode buffer 614 is configured to provide isolation between the gain stage and the output. The cascode buffer 614 can also be configured to improve the gain of the variable gain amplifier 610. The output load 616 is configured to provide a load to current to generate an output voltage swing. The output load 616 can be configured to be tuned or tunable for each band received at the inputs. For example, the output load includes a variable capacitor C2 that can be tuned for particular cellular frequency bands. The output load 616 can also be configured to improve return loss and/or increase bandwidth by tailoring the resistance R1 of the output load 616.

The voltage VDD can be configured to set the gain mode of the variable gain amplifier 310b. For example, the voltage VDD can be configured so that a lower current flowing through the output load 316 corresponds to a lower gain of the variable gain amplifier 310b.

Figure 7A:
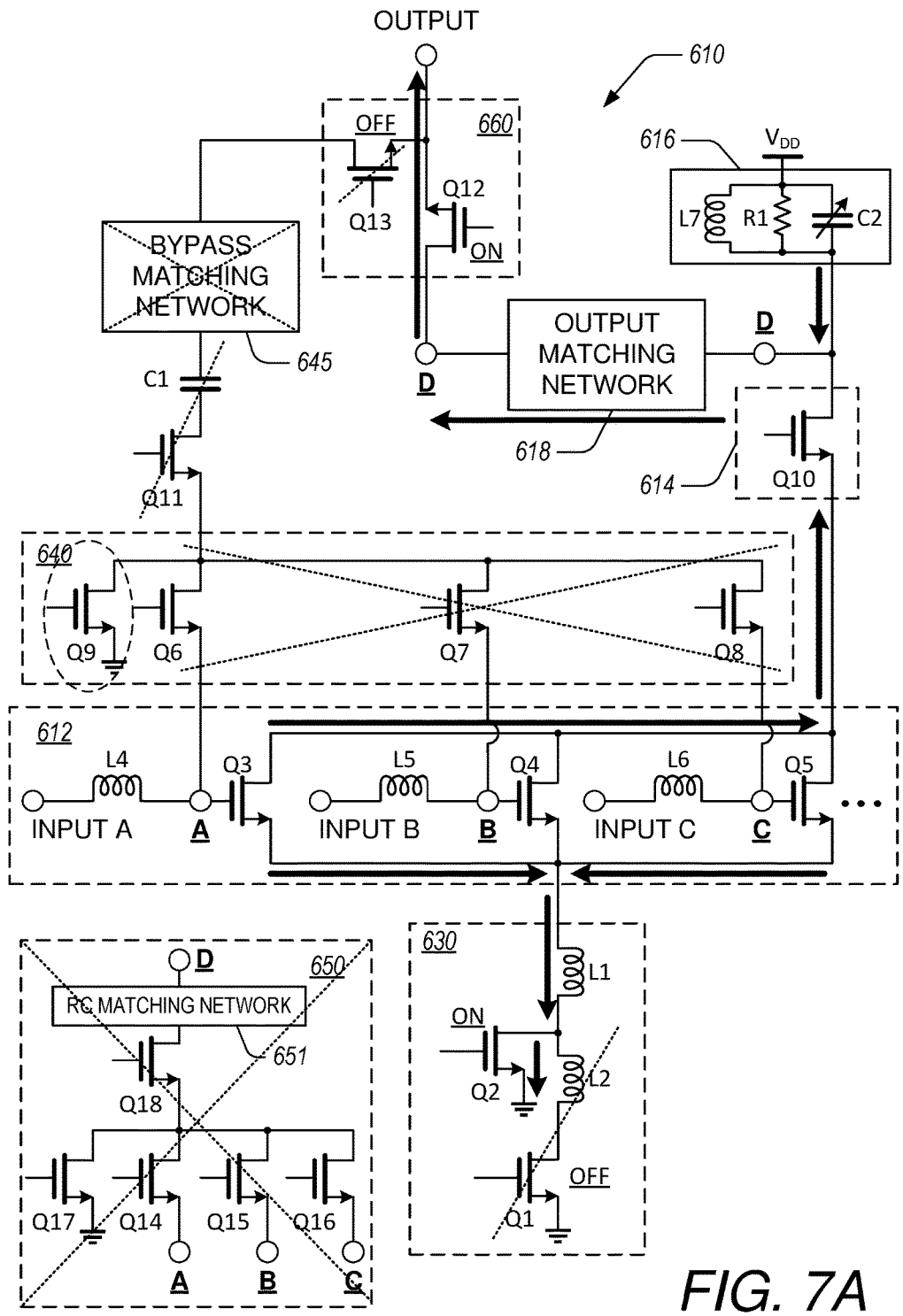
FIGS. 7A, 7B, and 7C illustrate examples of operating modes of the variable gain signal amplifier configuration of FIG. 6.
Figure 7B:
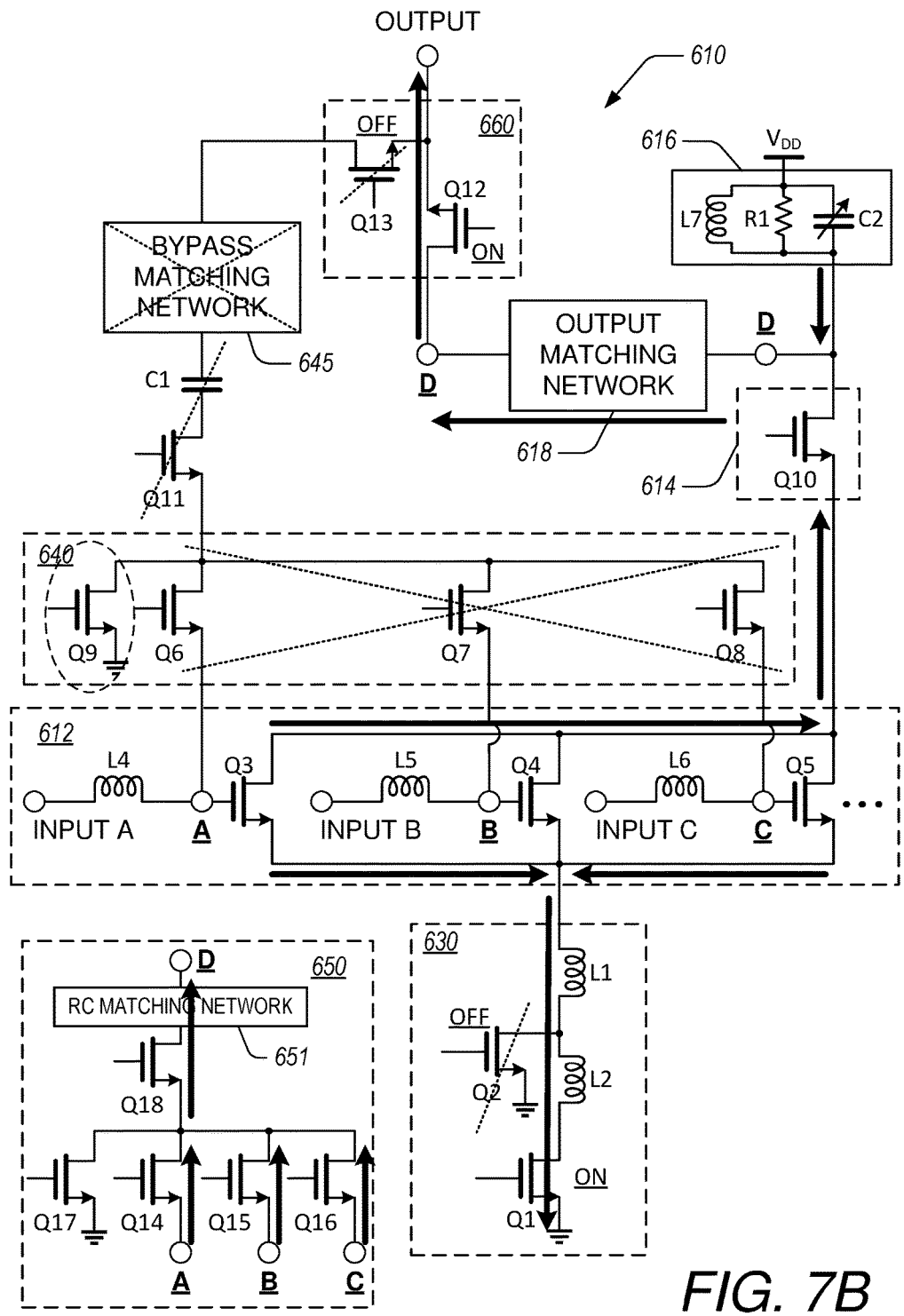
Figure 7C:
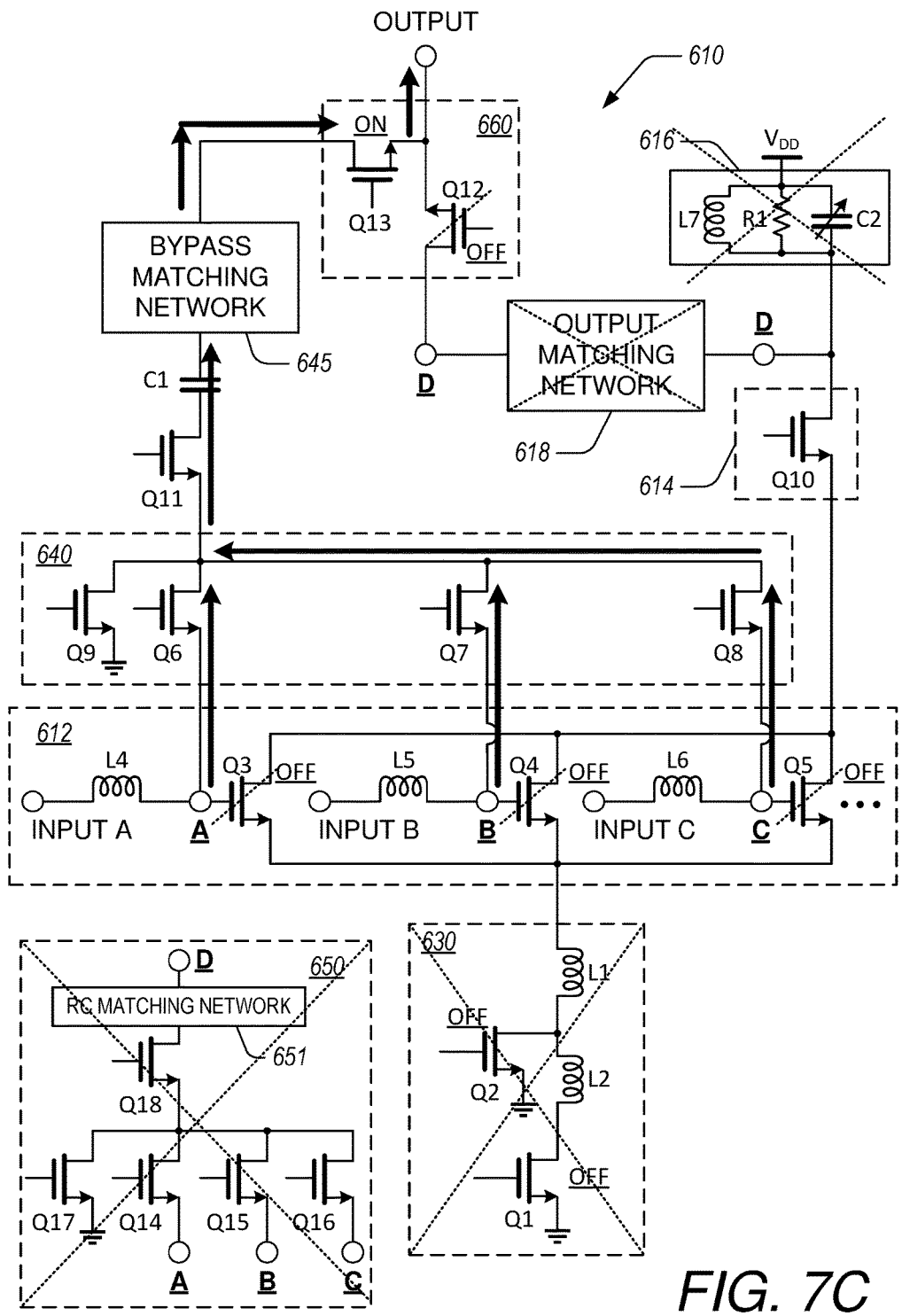

FIGS. 7A-7C illustrate examples of operating modes of the variable gain signal amplifier configuration 610 of FIG. 6. FIG. 7A illustrates operation in one or more high gain modes. In these high gain modes, the bypass block 640 is deactivated, except for the shunt switch Q9. Signals received at the inputs A, B, and C are directed through the gain stage comprising transistors Q3-Q5 and through the cascode buffer 614 to the output through the output matching network 618 and the bypass switch 660. The bypass switch activates Q12 and deactivates Q13 in these high gain modes. Furthermore, the transistor Q2 is on and the transistor Q1 is off in these high gain modes so that the inductance provided to the gain stage through the degeneration switching block 630 is L1. The medium gain mode feedback block 650 is also deactivated in these high gain modes.

FIG. 7B illustrates operation in one or more medium gain modes. These modes may also be referred to as low-gain, high-linearity modes. In these medium gain modes, operation is similar to the operation of the one or more high gain modes with notable differences. First, transistor Q2 is off and the transistor Q1 is on in the degeneration block 630 so that the inductance provided to the gain stage through the degeneration switching block 630 is provided by both L1 and L2. Thus, increased impedance is provided for lower gain modes, or, decreased impedance is provided for higher gain modes. Second, the medium gain mode feedback block 650 is activated. This provides additional feedback to the circuit, similar to adding a second degeneration block.

FIG. 7C illustrates operation in one or more low gain modes. In these low gain modes, the bypass block 640 is activated and the gain stage transistors Q3-Q5 are deactivated. Signals received at the inputs A, B, and C are directed through the bypass block 640 to the output through the bypass matching network 645 and the bypass switch 660. The bypass switch activates Q13 and deactivates Q12 in these low gain modes. Furthermore, the transistors Q1 and Q2 are off to deactivate the degeneration switching block 630 to improve linearity performance by reducing or minimizing leakage current through the gain stage transistors Q3-Q5. The medium gain mode feedback block 650 is also deactivated in these low gain modes.

Figure 8:
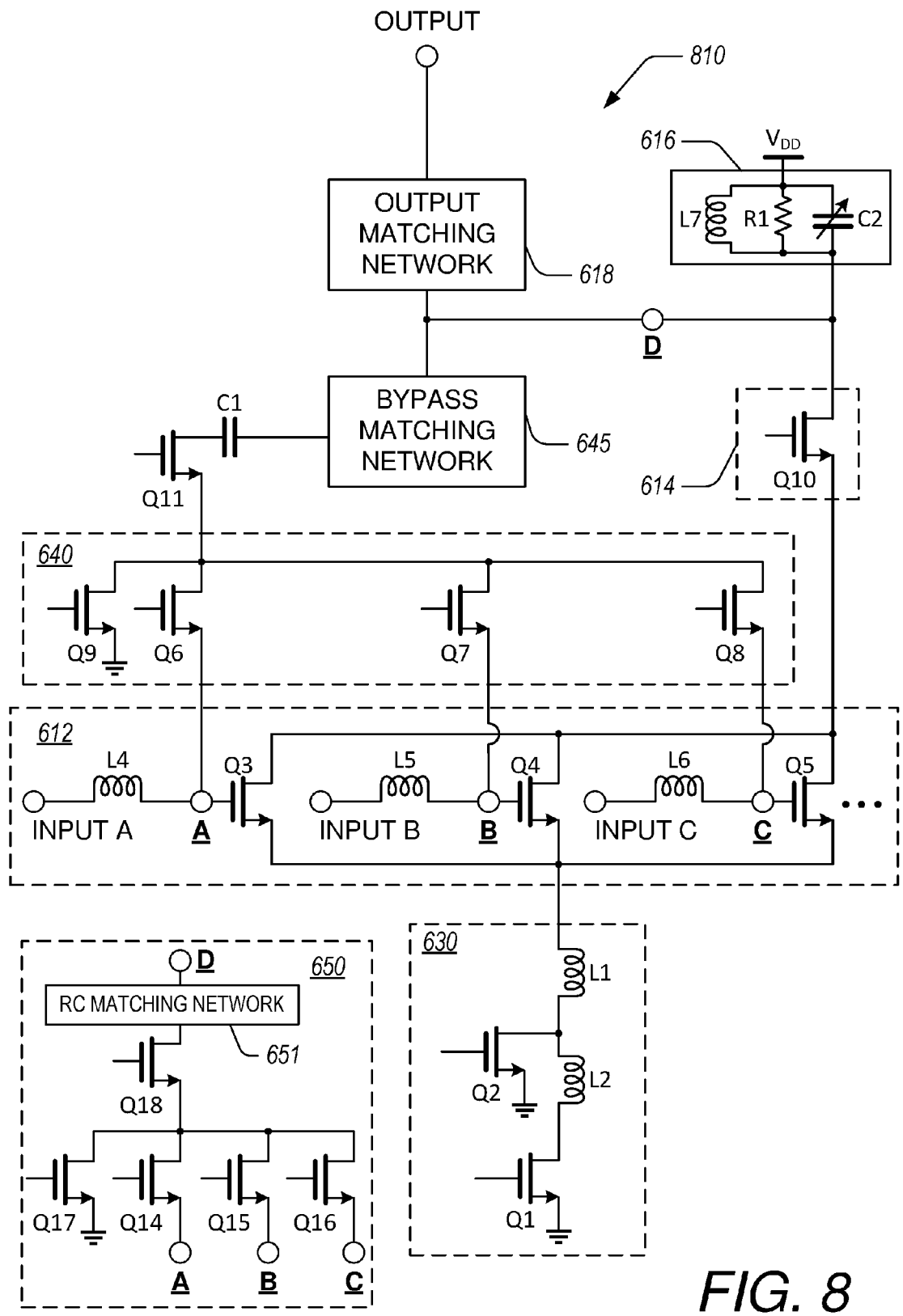
FIG. 8 illustrates a variable gain signal amplifier that is similar to the variable gain signal amplifier configuration of FIG. 6, but with the bypass switch removed.

FIG. 8 illustrates a variable gain signal amplifier 810 that is similar to the variable gain signal amplifier configuration 610 of FIG. 6, but with the bypass switch 660 removed. With the removal of the bypass switch, the output of the bypass matching network 645 instead couples to an input node of the output matching network 618. In this configuration, there is no bypass switch to control selection of an amplification path or a bypass path. Rather, the selected transistors of the gain stage (e.g., transistors Q3-Q5) and of the bypass block (e.g., transistors Q6-Q8) are selectively activated and deactivated to provide the bypass path or the amplification path.

Figure 9:
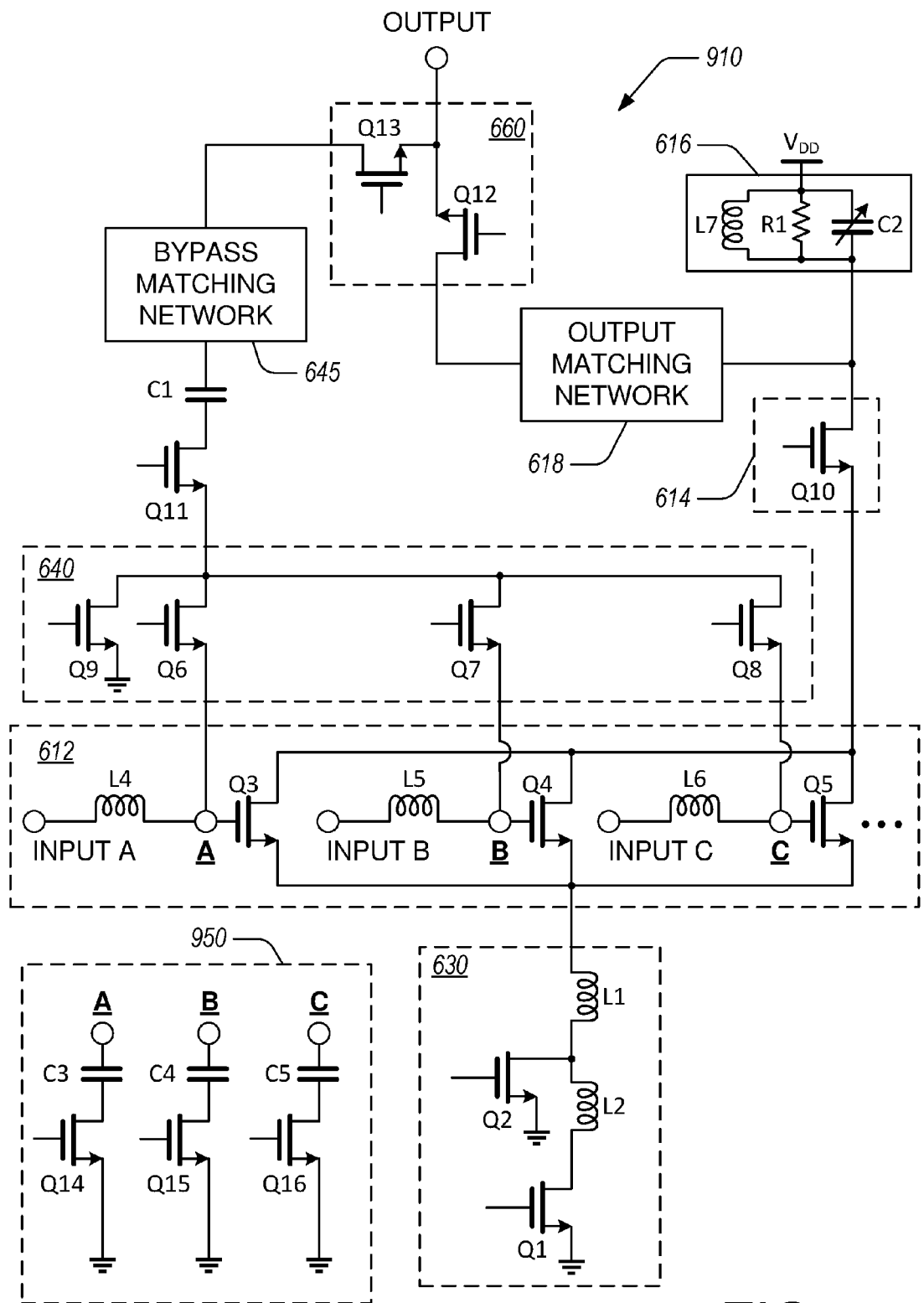
FIG. 9 illustrates a variable gain signal amplifier that is similar to the variable gain signal amplifier configuration of FIG. 6, but with a shutdown switch block instead of the medium gain mode feedback module.

FIG. 9 illustrates a variable gain signal amplifier 910 that is similar to the variable gain signal amplifier configuration 610 of FIG. 6, but with a shutdown switch block 950 instead of a medium gain mode feedback module. In this configuration, the point $\underline{D}$ is removed because the shutdown switch block 950 does not couple to the amplification path at an output node of the output matching network 618. Instead, the shutdown switch block 950 includes transistors Q14-Q16 and capacitors C3-C5 configured to selectively isolate the input nodes A, B, and C. In some embodiments, the shutdown switch block 950 does not include the capacitors C3-C5. The shutdown switch block 950 can be configured to turn a switch on (e.g., activate a transistor) when a corresponding input is not in use. This can be done to shut off that input to ground to reduce or eliminate leakage in the amplifier configuration.

Figure 10:
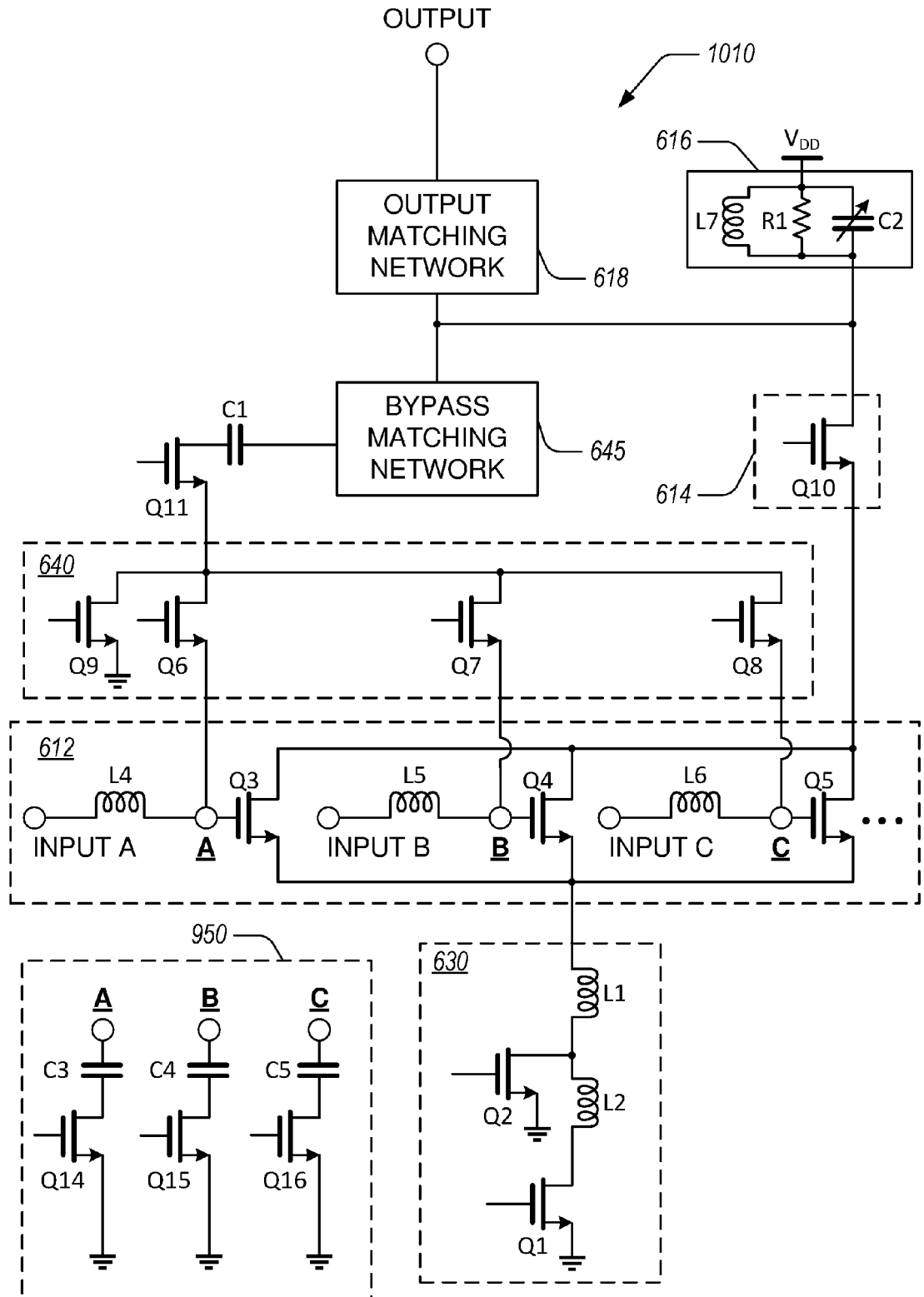
FIG. 10 illustrates a variable gain signal amplifier 1010 that is similar to the variable gain signal amplifier configuration of FIG. 9, but with the bypass switch removed.

FIG. 10 illustrates a variable gain signal amplifier 1010 that is similar to the variable gain signal amplifier configuration 910 of FIG. 9, but with the bypass switch 660 removed. As with the variable gain signal amplifier 810 of FIG. 8, the removal of the bypass switch results in the output of the bypass matching network 645 being coupled to an input node of the output matching network 618. In this configuration, there is no bypass switch to control selection of an amplification path or a bypass path. Rather, the selected transistors of the gain stage (e.g., transistors Q3-Q5) and of the bypass block (e.g., transistors Q6-Q8) are selectively activated and deactivated to provide the bypass path or the amplification path.

Examples of Products and Architectures

Figure 11:
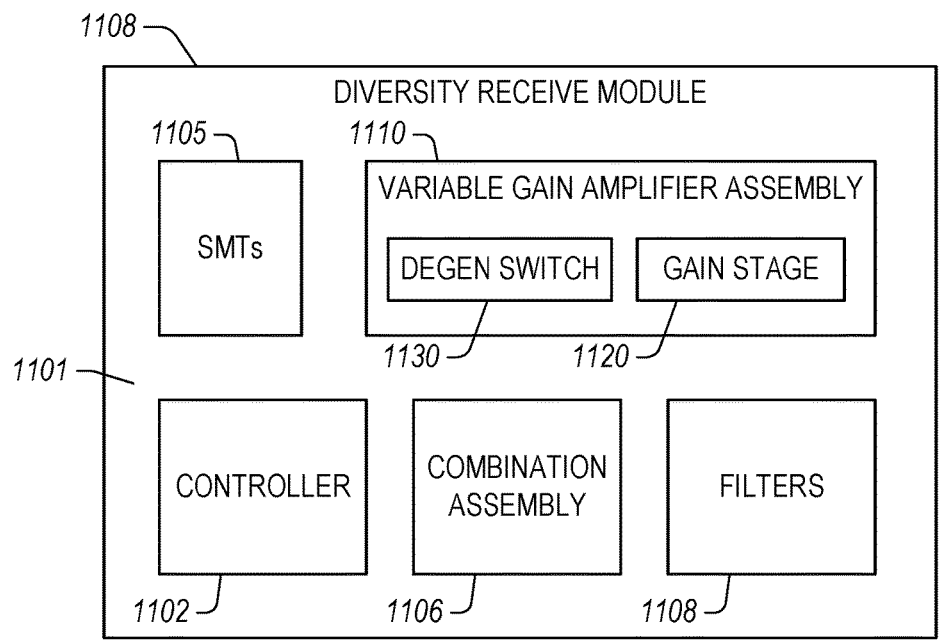
FIG. 11 shows that in some embodiments, some or all of the diversity receiver configurations can be implemented, wholly or partially, in a module.

FIG. 11 shows that in some embodiments, some or all of the diversity receiver configurations, including some or all of the diversity receiver configurations having combinations of features (e.g., FIGS. 1-10), can be implemented, wholly or partially, in a module. Such a module can be, for example, a front-end module (FEM). Such a module can be, for example, a diversity receiver (DRx) FEM. Such a module can be, for example, a multi-input, multi-output (MiMo) module.

In the example of FIG. 11, a module 1108 can include a packaging substrate 1101, and a number of components can be mounted on such a packaging substrate 1101. For example, a controller 1102 (which may include a front-end power management integrated circuit [FE-PIMC]), a combination assembly 1106, a variable gain amplifier assembly 1110 that includes a gain stage 1120 and a degeneration switching block 1130 having one or more features as described herein, and a filter bank 1108 (which may include one or more bandpass filters) can be mounted and/or implemented on and/or within the packaging substrate 1101. Other components, such as a number of SMT devices 1105, can also be mounted on the packaging substrate 1101. Although all of the various components are depicted as being laid out on the packaging substrate 1101, it will be understood that some component(s) can be implemented over other component(s).

Figure 12:
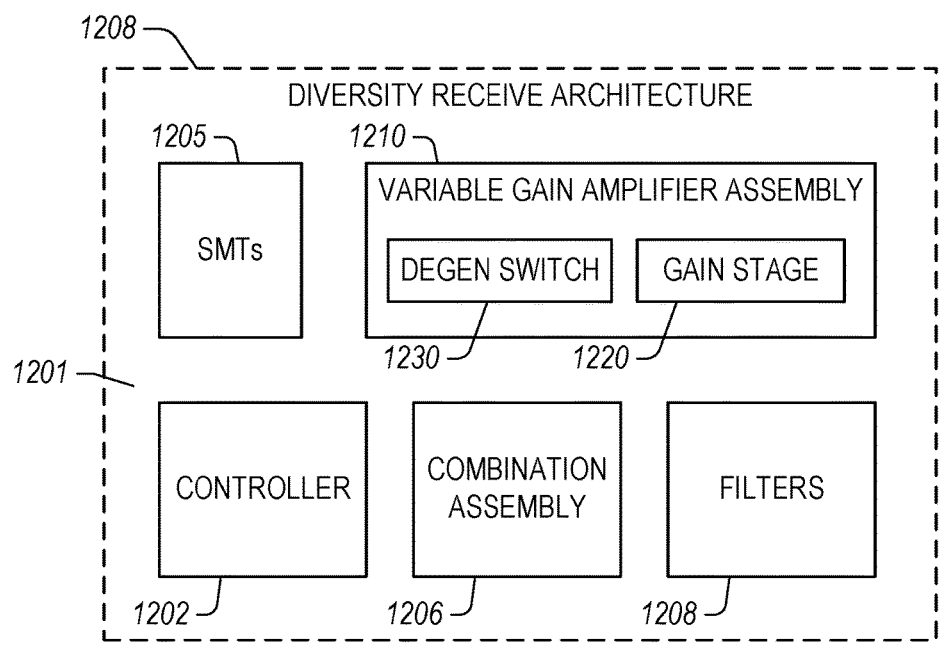
FIG. 12 shows that in some embodiments, some or all of the diversity receiver configurations can be implemented, wholly or partially, in an architecture.

FIG. 12 shows that in some embodiments, some or all of the diversity receiver configurations, including some or all of the diversity receiver configurations having combinations of features (e.g., FIGS. 1-10), can be implemented, wholly or partially, in an architecture. Such an architecture may include one or more modules, and can be configured to provide front-end functionality such as diversity receiver (DRx) front-end functionality.

In the example of FIG. 12, an architecture 1208 can include a controller 1202 (which may include a front-end power management integrated circuit [FE-PIMC]), a combination assembly 1206, a variable gain amplifier assembly 1210 that includes a gain stage 1220 and a degeneration switching block 1230 having one or more features as described herein, and a filter bank 1208 (which may include one or more bandpass filters) can be mounted and/or implemented on and/or within the packaging substrate 1201. Other components, such as a number of SMT devices 1205, can also be implemented in the architecture 1208.

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 13:
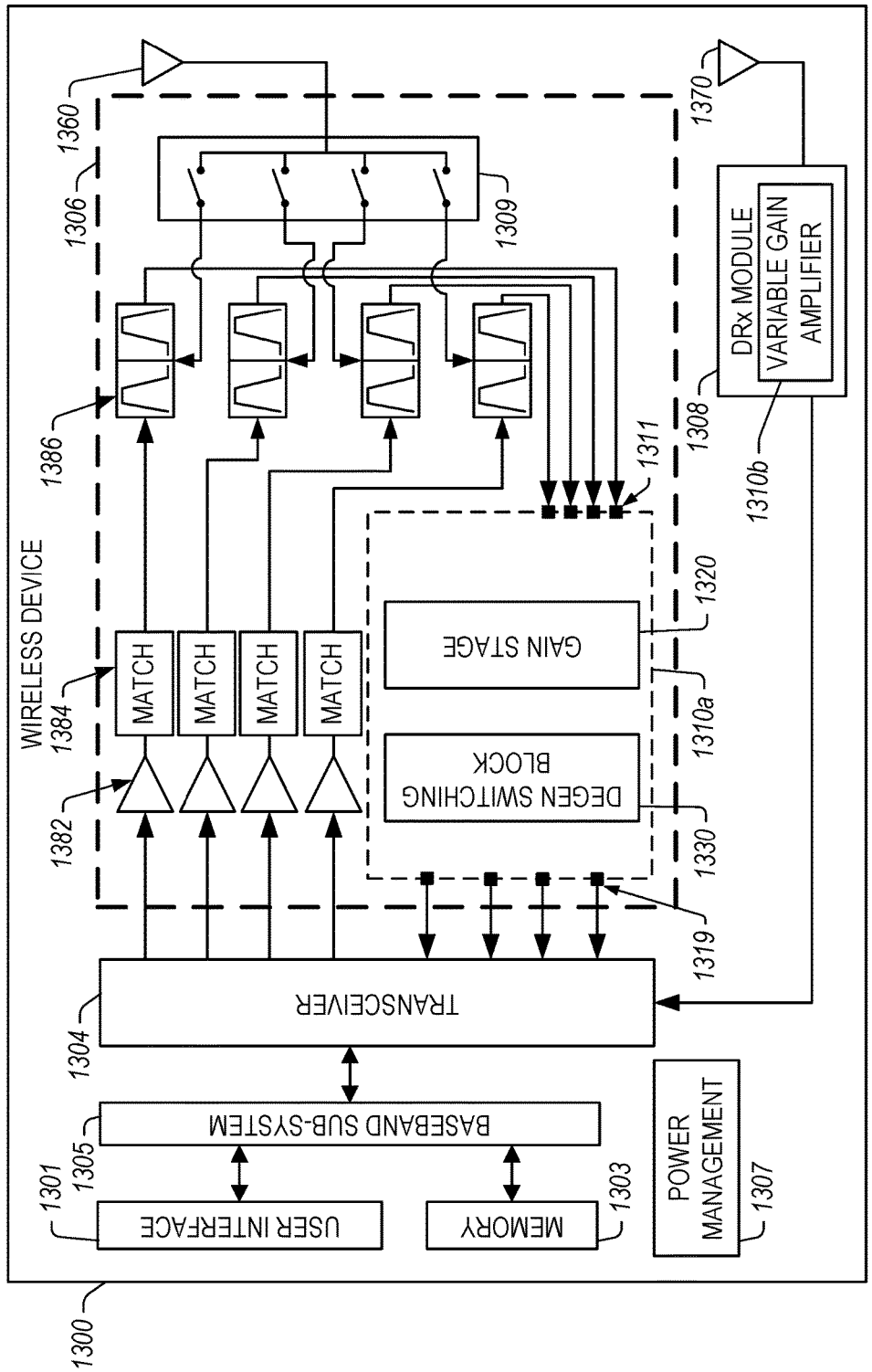
FIG. 13 illustrates an example wireless device having one or more advantageous features described herein.

FIG. 13 depicts an example wireless device 1300 having one or more advantageous features described herein. In the context of one or more modules having one or more features as described herein, such modules can be generally depicted by a dashed box 1306 (which can be implemented as, for example, a front-end module) and a diversity receiver (DRx) module 1308 (which can be implemented as, for example, a front-end module).

Referring to FIG. 13, power amplifiers (PAs) 1382 can receive their respective RF signals from a transceiver 1304 that can be configured and operated to generate RF signals to be amplified and transmitted, and to process received signals. The transceiver 1304 is shown to interact with a baseband sub-system 1305 that is configured to provide conversion between data and/or voice signals suitable for a user and RF signals suitable for the transceiver 1304. The transceiver 1304 can also be in communication with a power management component 1307 that is configured to manage power for the operation of the wireless device 1300. Such power management can also control operations of the baseband sub-system 1305 and the modules 1306 and 1308.

The baseband sub-system 1305 is shown to be connected to a user interface 1301 to facilitate various input and output of voice and/or data provided to and received from the user. The baseband sub-system 1305 can also be connected to a memory 1303 that is configured to store data and/or instructions to facilitate the operation of the wireless device, and/or to provide storage of information for the user.

In the example wireless device 1300, outputs of the PAs 1382 are shown to be matched (via respective match circuits 1384) and routed to their respective duplexers 1386. Such amplified and filtered signals can be routed to a primary antenna 1360 through a switching network 1309 for transmission. In some embodiments, the duplexers 1386 can allow transmit and receive operations to be performed simultaneously using a common antenna (e.g., primary antenna 1360). In FIG. 13, received signals are shown to be routed to a variable gain amplifier assembly 1310a, which provides the features and benefits of the variable gain amplifiers described herein. The DRx module 1308 includes a similar variable gain amplifier assembly 1310b as well.

In the example wireless device 1300, signals received at the primary antenna 1360 can be sent to a variable gain amplifier 1310a in the front end module 1306. The variable gain amplifier 1310a can include a gain stage 1320 and a degeneration switching block 1330. The variable gain amplifier 1310a is configured to receive a plurality of signals at inputs 1311 and output a plurality of processed signals at outputs 1319. The variable gain amplifier 1310a is configured to amplify signals based at least in part on a gain mode and to provide targeted impedances with the degeneration switching block 330 based at least in part on the gain mode. This can be done to improve linearity for signals relative to variable gain amplifiers that do not include one or more of the described features. In at least one low gain mode, the gain stage 1320 and the degeneration switching block 1330 can be bypassed. In at least one non-low gain mode, additional feedback can be provided in the variable gain amplifier 1310a to improve linearity of the amplification process, such as through a medium gain mode feedback module, as described herein.

The wireless device also includes a diversity antenna 1370 and a diversity receiver module 1308 that receives signals from the diversity antenna 1370. The diversity receive module 1308 includes a variable gain amplifier 1310b, similar to the variable gain amplifier 1310a in the front end module 1306. The diversity receiver module 1308 and the variable gain amplifier 1310b process the received signals and transmit the processed signals to the transceiver 1304. In some embodiments, a diplexer, triplexer, or other multiplexer or filter assembly can be included between the diversity antenna 1370 and the diversity receiver module 1370, as described herein.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1. It is to be understood that the term radio frequency (RF) and radio frequency signals refers to signals that include at least the frequencies listed in Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |

TABLE 1-continued

| Band | Mode | Tx Frequency Range (MHz) | Rx Frequency Range (MHz) |
|---|---|---|---|
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A variable-gain signal amplifier comprising:
    a variable-gain stage configured to receive an input signal and generate an amplified output signal;
    a degeneration switching block coupled to the variable-gain stage and configured to provide a plurality of gain levels of the variable-gain stage; and
    a medium gain mode feedback block coupled to an input of the variable-gain stage, the medium gain mode configured to provide feedback to the variable-gain stage for a subset of the plurality of gain levels.

2. The amplifier of claim 1 wherein the amplifier is configured to selectively provide a bypass path that bypasses the variable-gain stage and an amplification path that passes through the variable-gain stage.

3. The amplifier of claim 1 wherein the degeneration switching block is further configured to provide tailored impedances to the variable gain stage.

4. The amplifier of claim 3 wherein the tailored impedances are configured to provide improved linearity in the amplified output signal relative to a variable gain stage that is not coupled to the degeneration switching block with the tailored impedances.

5. The amplifier of claim 3 wherein the degeneration switching block is configured to provide a first tailored impedance for a first gain level of the plurality of gain levels and a second tailored impedance for a second gain level of the plurality of gain levels.

6. The amplifier of claim 5 wherein the first tailored impedance is greater than the second tailored impedance and the first gain level is less than the second gain level.

7. The amplifier of claim 1 wherein the medium gain mode feedback block and the degeneration switching block provide improved linearity to the amplified output signal relative to an amplifier without the medium gain feedback block and the degeneration switching block.

8. The amplifier of claim 1 further comprising a bypass block coupled to an input of the variable gain stage, the bypass block configured to be activated in a low gain level of the plurality of gain levels to provide a bypass path that does not include the variable-gain stage.

9. The amplifier of claim 8 wherein the bypass path does not include the degeneration switching block.

10. The amplifier of claim 1 further comprising a plurality of input nodes coupled to the variable-gain stage.

11. The amplifier of claim 10 wherein the amplifier is configured to receive a plurality of input signals at the plurality of input nodes, individual received signals having frequencies within different signal frequency bands.

12. The amplifier of claim 11 wherein the amplifier is configured to amplify signals received at individual input ports independent of amplification of other received signals.

13. A front end architecture comprising:
    a variable gain signal amplifier including a variable-gain stage configured to receive an input signal and generate an amplified output signal and a degeneration switching block coupled to the variable-gain stage and configured to provide a plurality of gain levels of the variable-gain stage and a medium gain mode feedback block coupled to an input of the variable-gain stage, the medium gain mode configured to provide feedback to the variable-gain stage for a subset of the plurality of gain levels;
    a filter assembly coupled to the variable gain signal amplifier to direct frequency bands to select inputs of the variable gain signal amplifier; and
    a controller implemented to control the variable gain signal amplifier to provide a plurality of gain modes such that, in a low gain mode, the variable gain signal amplifier directs signals along a path that bypasses the variable-gain stage.

14. The architecture of claim 13 wherein the degeneration switching block is further configured to provide tailored impedances to the variable-gain stage.

15. The architecture of claim 14 wherein the tailored impedances are configured to provide improved linearity in the amplified output signal relative to a variable gain stage that is not coupled to the degeneration switching block with the tailored impedances.

16. The architecture of claim 14 wherein the degeneration switching block is configured to provide a first tailored impedance for a first gain level of the plurality of gain levels and a second tailored impedance for a second gain level of the plurality of gain levels.

17. A wireless device comprising:
a diversity antenna;
a filter assembly coupled to the diversity antenna to receive signals and to direct frequency bands along select paths;
a variable gain signal amplifier including a variable-gain stage configured to receive an input signal and generate an amplified output signal and a degeneration switching block coupled to the variable-gain stage and configured to provide a plurality of gain levels of the variable-gain stage and a medium gain mode feedback block coupled to an input of the variable-gain stage, the medium gain mode configured to provide feedback to the variable-gain stage for a subset of the plurality of gain levels; and
a controller implemented to control the variable gain signal amplifier to provide a plurality of gain modes such that, in a low gain mode, the variable gain signal amplifier directs signals along a path that bypasses the variable-gain stage.

18. The device of claim 17 wherein the degeneration switching block is further configured to provide tailored impedances to the variable-gain stage.

19. The device of claim 18 wherein the degeneration switching block is configured to provide a first tailored impedance for a first gain level of the plurality of gain levels and a second tailored impedance for a second gain level of the plurality of gain levels.

* * * * *